(12) United States Patent
Tseng

(10) Patent No.: US 8,794,391 B2
(45) Date of Patent: Aug. 5, 2014

(54) SAFETY BRAKING SYSTEM

(76) Inventor: Ton-Rong Tseng, Banciao (TW)

( * ) Notice: Subject to any disclaimer, the term of this patent is extended or adjusted under 35 U.S.C. 154(b) by 131 days.

(21) Appl. No.: 13/415,146

(22) Filed: Mar. 8, 2012

(65) Prior Publication Data
US 2012/0175197 A1 Jul. 12, 2012

Related U.S. Application Data

(63) Continuation-in-part of application No. 11/775,291, filed on Jul. 10, 2007, now Pat. No. 8,136,638.

(51) Int. Cl.
*B62L 1/06* (2006.01)
(52) U.S. Cl.
USPC .................. 188/24.13; 74/480 R; 74/501.6
(58) Field of Classification Search
USPC ............. 188/2 D, 24.11, 24.12, 24.13, 24.14, 188/24.15, 24.16; 74/480 R, 501.5 R, 501.6, 74/502.6
See application file for complete search history.

(56) References Cited

U.S. PATENT DOCUMENTS

| | | | | |
|---|---|---|---|---|
| 4,057,127 A * | 11/1977 | Woodring | ................... | 188/24.16 |
| 4,773,509 A * | 9/1988 | Sato | ........................... | 188/24.16 |
| 4,773,510 A * | 9/1988 | Sato | ........................... | 188/24.16 |
| 4,841,525 A | 6/1989 | Lieske et al. | | |
| 7,104,155 B2 | 9/2006 | Nilsson | | |
| 8,469,156 B2 * | 6/2013 | Lu et al. | ........................ | 188/2 D |

FOREIGN PATENT DOCUMENTS

| | | | |
|---|---|---|---|
| JP | 06001279 A | * | 1/1994 |
| TW | M402254 U | | 4/2011 |

* cited by examiner

*Primary Examiner* — Thomas J Williams
(74) *Attorney, Agent, or Firm* — C. G. Mersereau; Nikolai & Mersereau, P.A.

(57) ABSTRACT

A safety braking system of to a bike, motorcycle or any other linear two-wheel vehicle, or any vehicle with a right brake lever and a left brake lever to respectively control respective braking actions to the front wheel and the rear wheel of the vehicle. Whenever either of the right brake lever or the left brake lever is pulled, the safety braking system controls the rear wheel brake to be activated before the front wheel brake to be activated.

14 Claims, 43 Drawing Sheets

SAFETY BRAKING SYSTEM

FIELD OF THE INVENTION

The present invention is a Continuation-In-Part application of U.S. patent application Ser. No. 11/775,291 filed on Jul. 10, 2007 now U.S. Pat. No. 8,136,638, and relates to a braking system, and more particularly, to a safety braking system for linear two-wheel vehicles so as to avoid from injury due to improper operation of the braking system.

BACKGROUND OF THE INVENTION

Description of the Prior Art

The braking system is a device about safety and is an extremely important component for vehicles. Improper operation or poor design of the braking system frequently results in traffic accident and/or injury to the drivers and/or the third party.

The conventional braking systems are operated by clipping or pulling the brake disc or drum with the use of linings. For light-duty vehicles, such as bicycles, the braking system directly brakes the wheel by the linings. A hand brake is usually used on brake bikes, motorcycles or other light-duty vehicles, while larger vehicles usually are braked by mechanical brake or power aided brake. However, the hand brakes include more drawbacks when compared with those braking systems using mechanical assistance or power aided braking system. The most serious and important drawback is insufficient braking force or difficulty in managing the braking force, contributing to or aggravate major traffic accidents or injuries.

Among the light-duty vehicles, the linear two-wheel bikes are most popular for its light in weight, easy manipulation and affordable price. The linear two-wheel bikes are not only relied upon as a short-range transportation means, but also used as for traveling, sporting, or racing purpose. The light-duty motorcycles are another familiar type of linear two-wheel vehicles.

When riding the bike or motorcycle, the weight of the vehicle and the rider is supported on the straight line, and the center of gravity is usually high so that the rider together with the bike may fall or slip when subject to external force or voluntary swing to left or right by its rider. Besides, in case of applying the braking force directly only to the front wheel and not to the rear wheel, the center of gravity would lean forward to significantly reduce stability of the frame and the rider thereby frequently resulting in accident. Accordingly, when applying a braking force to the bike or motorcycle of linear two-wheel construction, the braking force must be first applied to the rear wheel before the front wheel for safety reason. This is particularly important for those vehicles equipped with a front shock absorber. Braking the front wheel first and then the rear wheel, the front shock absorber will cause the shock absorber to sink and this brings further the center of gravity of the rider who is already in a position of comparatively higher center of gravity. Leaning forward and the acceleration force would cause the vehicle to toss around and seriously threaten the life of the rider.

The linear two-wheel bikes or motorcycles usually equipped with a hand braking system which provides a right hand brake and a left hand brake. The left hand brake controls application of the brake for the front wheel and the right hand brake controls the brake for the rear wheel. However, some bicycles are installed in opposite ways. In other words, there is no mandatory principle or standard on whether which hand brake should control which wheel, and that is totally left for the frame manufacturer, a bodywork shop or a rider to determine on discretion.

In addition, when a rider is encountered by an emergency, he or she tends to naturally applies the hand brake mounted on the side where the imminent threaten is approaching instead of braking the rear wheel first before breaking the front wheel. That makes even dangerous to the rider for not doing the right action in a quick response in facing an emergency situation.

U.S. Pat. No. 7,104,155 discloses a device for a two wheeled vehicle with two independent cable operated brake systems which includes two pivoting levers connecting the two cables operating the brake calipers via cables enclosed in casings from the hand lever to the calipers, one operating the front brake and one operating the rear brake. That will regardless of which or both hand levers are applied first, the rear brake will be actuated before and with more force that to the front brake through the offset pivot point of the two levers. The fulcrum action will alter the length of the casing relative to the cable length of one brake and by tension transfer the differences of casing length to cable length on the opposite side and apply the brakes rear first with more force than front brake.

Taiwan Utility Patent No. M402254 discloses a braking sequence control device for two-wheel vehicles. In the control case, the block connector and the delay-antilock spring are used as the operation units for control of the left hand brake and the right hand brake. The left and brake cable, the right hand brake cable and the rear wheel brake cable are connected with the block connector. The front wheel brake cable extends through the block connector and is connected to the delay-antilock spring, a end piece on the distal end of the front wheel brake cable contacts the delay-antilock spring. When either of the right hand brake cable or the rear wheel brake cable is operated, the rear wheel is first braked and the front wheel is braked in sequence. The first step of braking is only slow the speed of the two-wheel vehicle and then the wheels are completed stopped at low speed. There are two different springs respectively connected to the front wheel braking unit and the rear wheel braking unit. When the rider brakes, the braking sequence control device applies different forces to the front wheel brake cable and the rear wheel brake cable, so as to achieve the purpose of delay braking. However, the springs have their inherent fatigue problems which are not suitable for long-term use.

The present invention intends to provide a safety braking system to ensure that the rear wheel will be braked before the front wheel.

SUMMARY OF THE INVENTION

The present invention relates to a safety braking system mounted to a bike, motorcycle or any other vehicle provided with two independent hand brakes for both wheels, that makes sure of always braking the rear wheel before braking the front wheel, regardless of whichever the left or the right hand brake is applied first so as to achieve safe effects by helping stabilize the frame and prevent from turning over.

The safety braking system brake of the present invention comprises two stages of braking mechanism, the primary mechanism and the secondary power transmission mechanism. Both left and right hand brakes are linked to the primary mechanism where the braking force is transferred to the secondary power transmission mechanism, and the secondary power transmission mechanism transfers the braking force to both brakes on the front and the rear wheels so as to brake the rear wheel first before the front wheel.

The secondary power transmission mechanism of the safety braking system of the present invention comprises two rollers. Two rollers move relatively to each other when the primary mechanism is subject to a braking force applied by a brake lever thus to cause the front wheel brake and the rear wheel brake to apply braking forces to the rear wheel and the front wheel in sequence.

Each roller further includes a larger wheel and a smaller wheel with each wheel provided with a groove along its edge. The larger wheel is connected to a lead cable of the rear wheel brake and the smaller wheel is connected to a lead cable of the front wheel brake. Upon applying a braking force, all motive forces will pull the brake rollers whether the right or the left hand brake lever is exercised to cause both rollers to have relative displacement so as to activate the lead cables. Whereas both brake rollers are not in the same diameter, a pull force exercised by the lead cable of the rear wheel brake placed on the larger roller is faster and greater than that by the lead cable of the front wheel brake placed on the smaller roller since the perimeter of the larger roller is longer than that of the smaller roller to ensure that the rear wheel is braked before the front wheel.

The two relative rollers of the safety braking system of the present invention provide a type and functions of a pulley in physics to feature effort-saving. The ratio of diameters between both rollers may vary depending on the model of the vehicle while so as to obtain proper braking forces applied to the front wheel and the rear wheel of the model of the vehicle.

The rollers may be directly pulled closer or farther by a brake cable of the brake lever, or the brake cable is pulled by using a pinion.

Multiple improved designs for the construction of the safety braking system of the present invention may be obtained based on the present invention. For example, two arc levers of the safety braking system pivoted to each other at the two respective centers of the arc levers. One side of the arc lever is connected to the brake cable of the brake lever while the other side of the arc lever in relation to the pivoting point is disposed with two wheels each with a groove along its edge. The lead cable of the rear wheel brake goes around the two wheels which are located remote from the pivoting point, the lead cable of the front wheel brake goes around the wheels located close to the pivoting point. By changing the distance between the wheel with groove along its edge and the pivoting point, the amount of change of the lead cable connected to the two wheels disposed to the outer side of the arc lever is greater than that of the lead cable connected to the inner side of the arc lever to permit the rear wheel to be braked first before the front wheel. Alternatively, a brake lever brake cable is connected to one side of the arc lever, two wheels each with a groove along its edge are connected to each arc lever on the opposite side to the pivoting point. The two wheels on one arc lever are fixed to the same point on the arc lever and cooperated with another two wheels with a groove along its edge to hold a lead cable and to cause different amount of change of the lead cable. Furthermore, a brake lever brake cable is connected to one side of the arc lever and two wheels each with a groove along its edge are disposed to an arc lever on the opposite side to the pivoting point. The lead cable held by another two wheels each with a groove along its edge is fixed to another arc lever to achieve the purpose of having a time delay in applying brake respectively for the front and the rear wheel of the vehicle.

By providing those three types of installations, the wheels connected to the front and the rear brakes can be individually mounted. The wheels controlling the front wheel is installed closer to the pivoting point than those controlling the rear wheel so as to produce different braking force and time delay. A locating mechanism is provided for the rider to readjust the position of each wheel with according to his/her riding behavior for improved safety.

The present invention makes the operations to the front wheel brake and the rear wheel brake be activated in sequence and whichever the left or right brake lever is pulled, the braking force applied to the rear wheel is larger than that to the front wheel.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
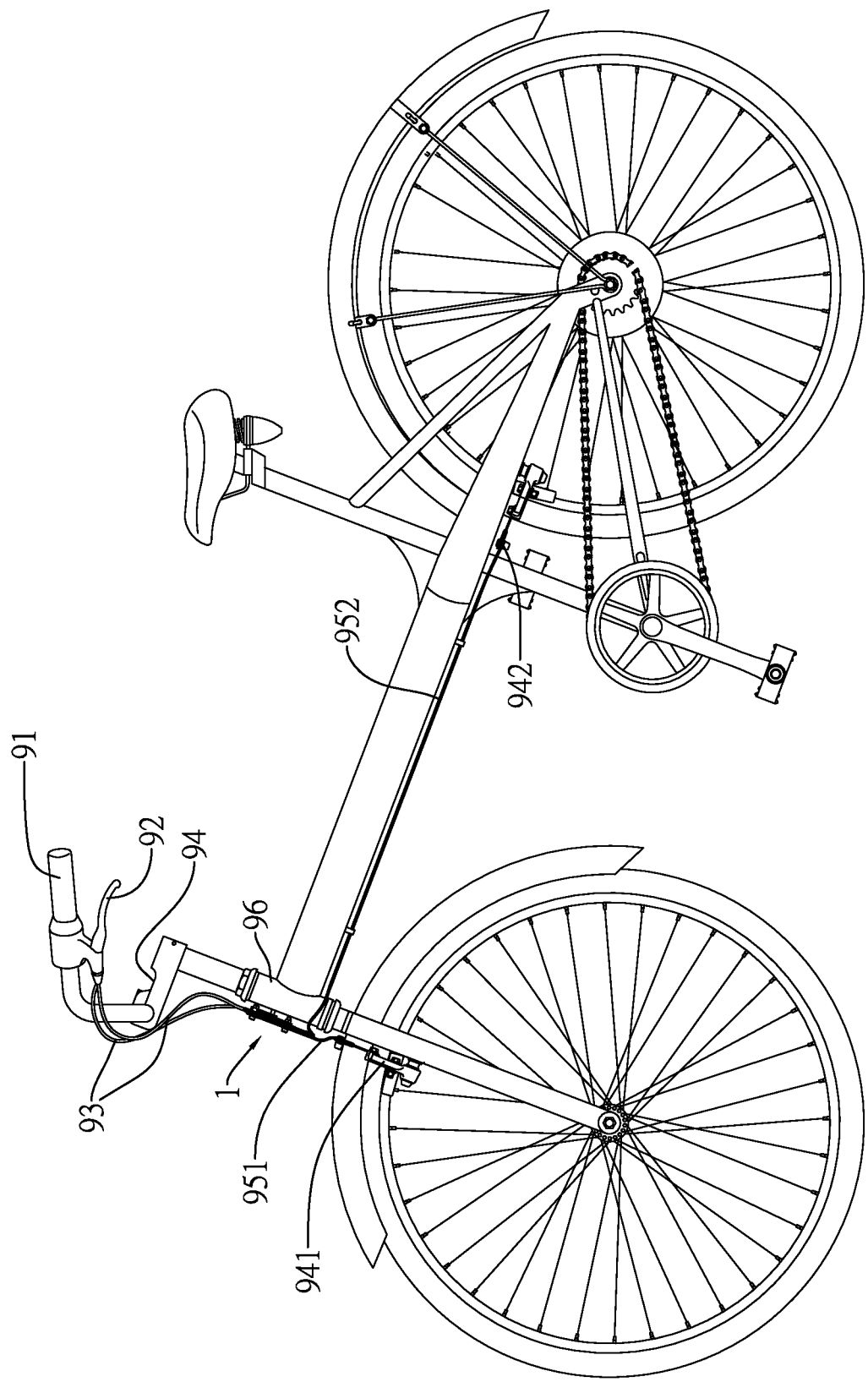
FIG. 1 shows a bike mounted with the safety braking system of the present invention.

Referring to FIG. 1, taken a bicycle as an embodiment for describing the safety braking system of the present invention, the present invention can also be applied to a light-duty motorcycle or any other light-duty vehicle provided with both left and right brake levers to respectively control the braking of the front wheel and the rear wheel. The bike is provided with a right handlebar 91 and a left handlebar 91 respectively mounted with a manual brake lever 92. Two respective brake cables 93 connected with both brake levers 92 are connected to the safety braking system 1 of the present invention. The safety braking system 1 is mounted to a head tube 96 or where between both handlebars 91, or coupled to a stem 94 and connected to a lead cable 951 and a lead cable 952 respectively of a front wheel brake 941 and a rear wheel brake 942. Accordingly, when either of both brake levers 92 is pulled, the rear wheel brake 942 is activated first to the rear wheel and then the front wheel 941 is activated to brake the front wheel.

Figure 2:
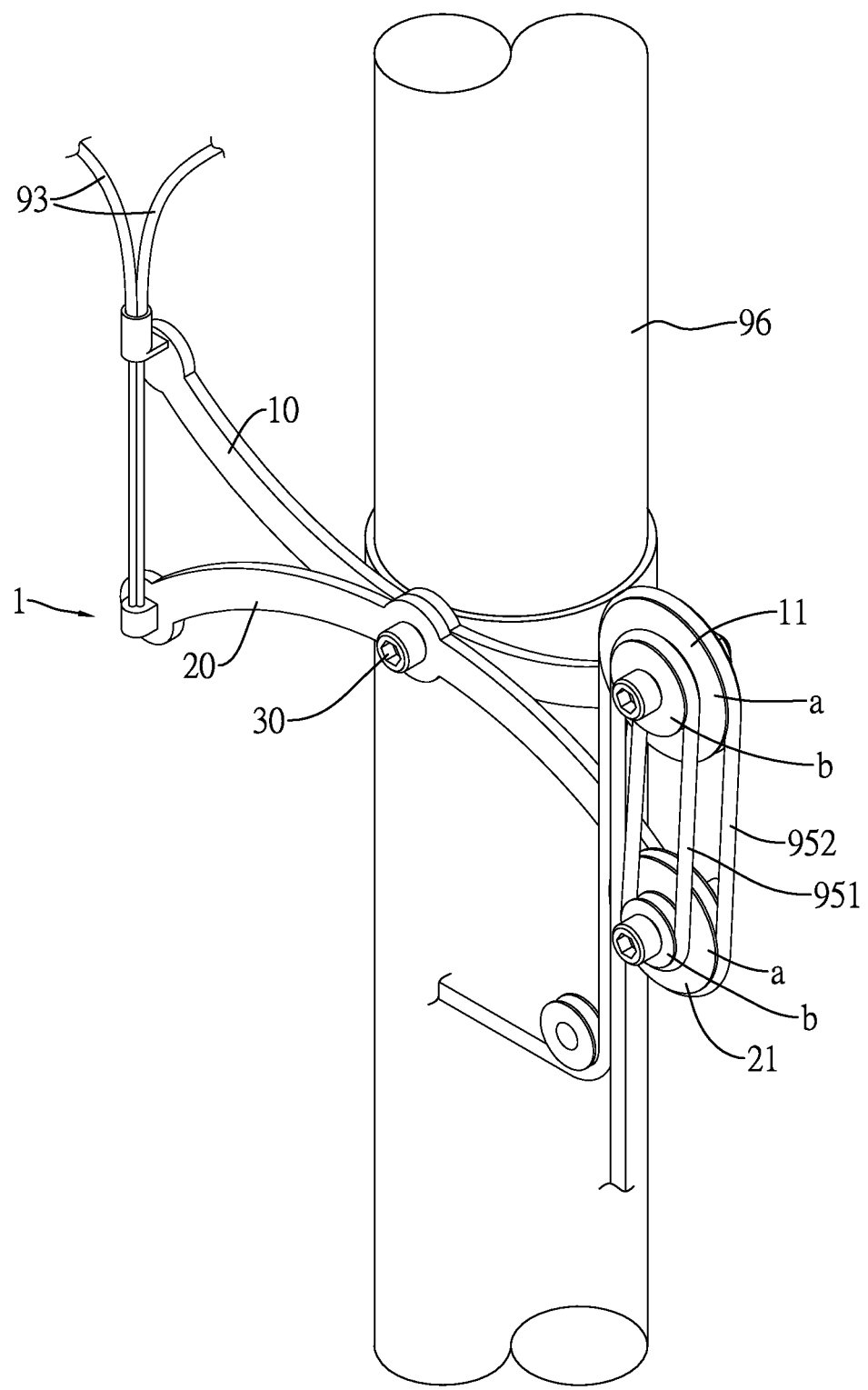
FIG. 2 is a perspective view of the first embodiment of the safety braking system of the present invention.

FIG. 2 shows the first preferred embodiment of the safety braking system 1 of the present invention, wherein the safety braking system 1 mounted to the head tube 96 comprises two arc levers 10, 20 pivoted to each other at a pivoting point 30. Two brake cables 93 are connected to one side of both arc levers 10, 20 to form a primary mechanism. On the opposite side of the pivoting point 30, two rollers 11, 21 are respectively provided to form a secondary power transmission mechanism.

Figure 3:
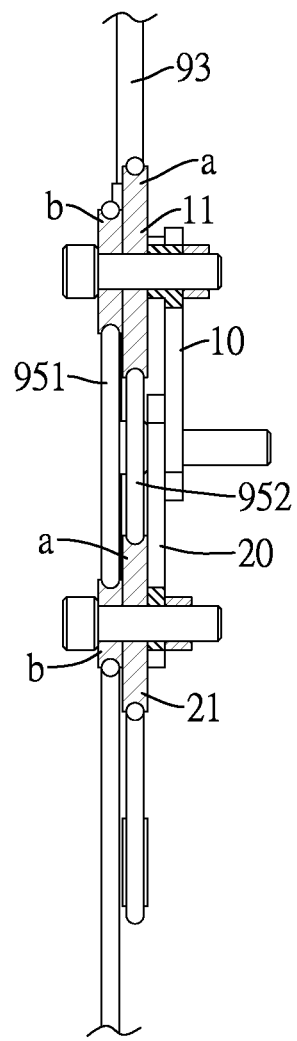
FIG. 3 is a sectional view of the first embodiment of the present invention.

Referring to FIG. 3, each roller 11, 21 includes a larger wheel "a" and smaller wheel "b" with each provided with a groove. The larger wheels "a" hold the lead cable 952 of the rear wheel brake and both of the smaller wheels "b" hold the lead cable 951 of the front wheel brake.

Figure 4:
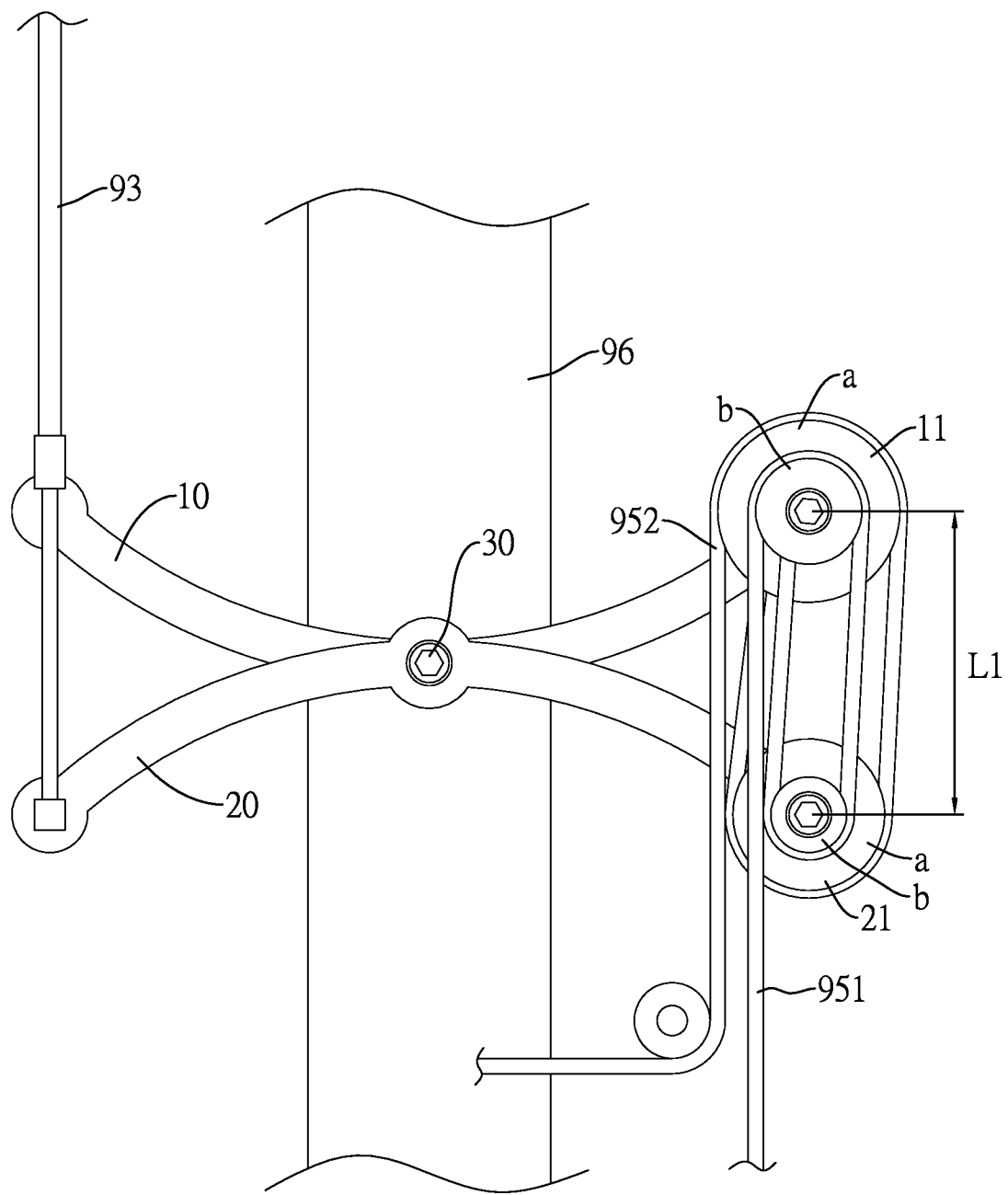
FIG. 4 is a plan view of the first embodiment of the present invention.
Figure 5:
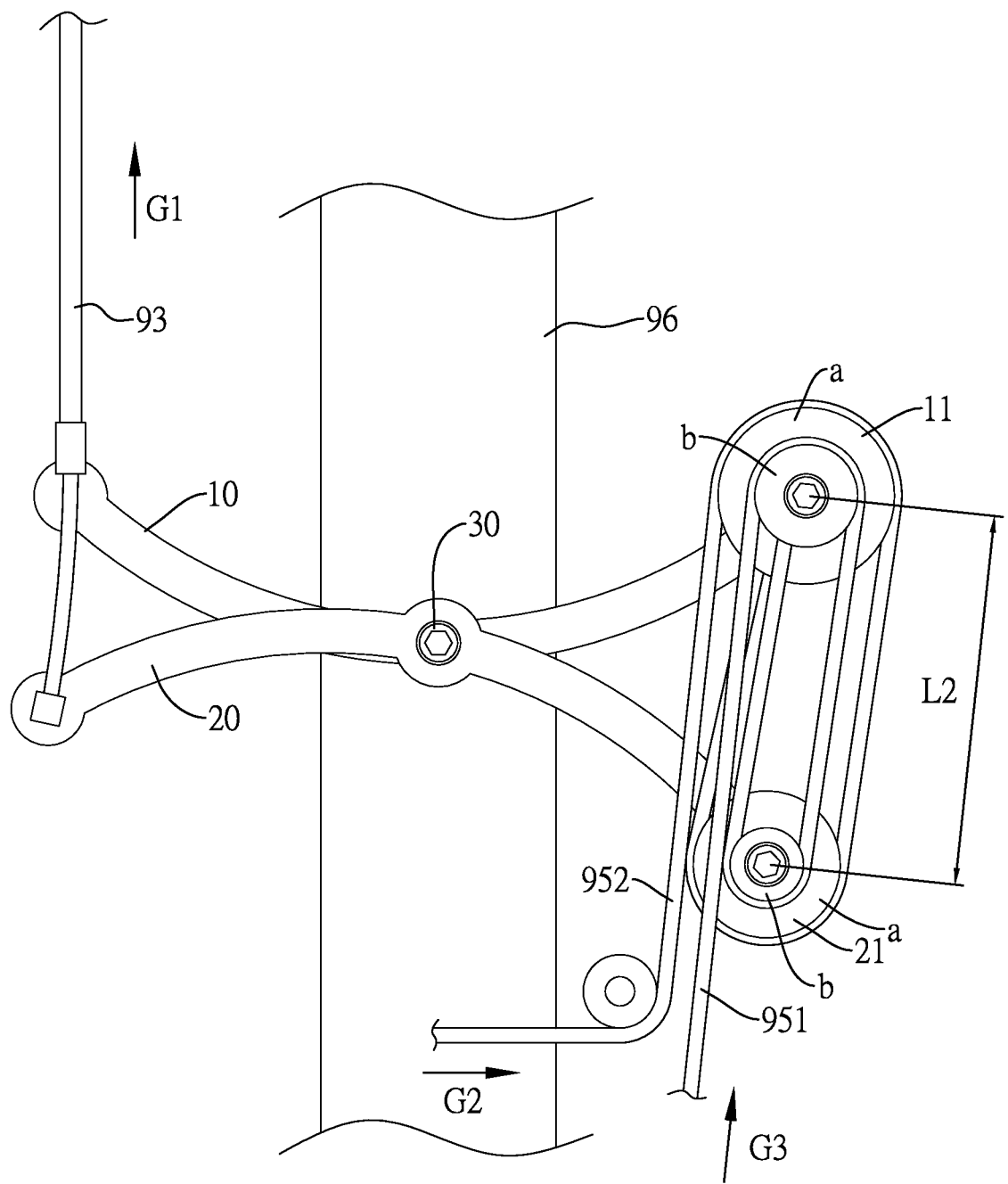
FIG. 5 shows operating status of the first embodiment of the present invention.

As shown in FIGS. 4 and 5, when the brake cable 93 connected to the brake lever is not yet pulled as illustrated in FIG. 4, the distance defined between the two centers of both rollers 11, 21 is designated as distance L1. When the brake cable 93 is pulled in the direction marked by the arrow G1 in FIG. 5, a braking force is created to move the primary mechanism comprised of both arc levers 10, 20. The primary mechanism transfers the braking force to the secondary power transmission mechanism, and the distance between both centers of rollers 11, 21 on the opposite side of both arc levers 10, 20 relatively increases to that as designated by L2. Meanwhile, both of the lead cable 952 of the rear brake held by both the larger wheels "a" of the two rollers 11, 21 and the lead cable 951 of the front brake held by both the smaller wheels "b" of two rollers 11, 21 create a pull force (as designated by arrows G2 and G3) for the secondary power transmission mechanism to respectively transfer the braking force to the front and the rear brakes. The rear wheel brake 942 then first brakes the rear wheel before the front wheel brake 941 applying a brake force to the front wheel.

Figure 6:
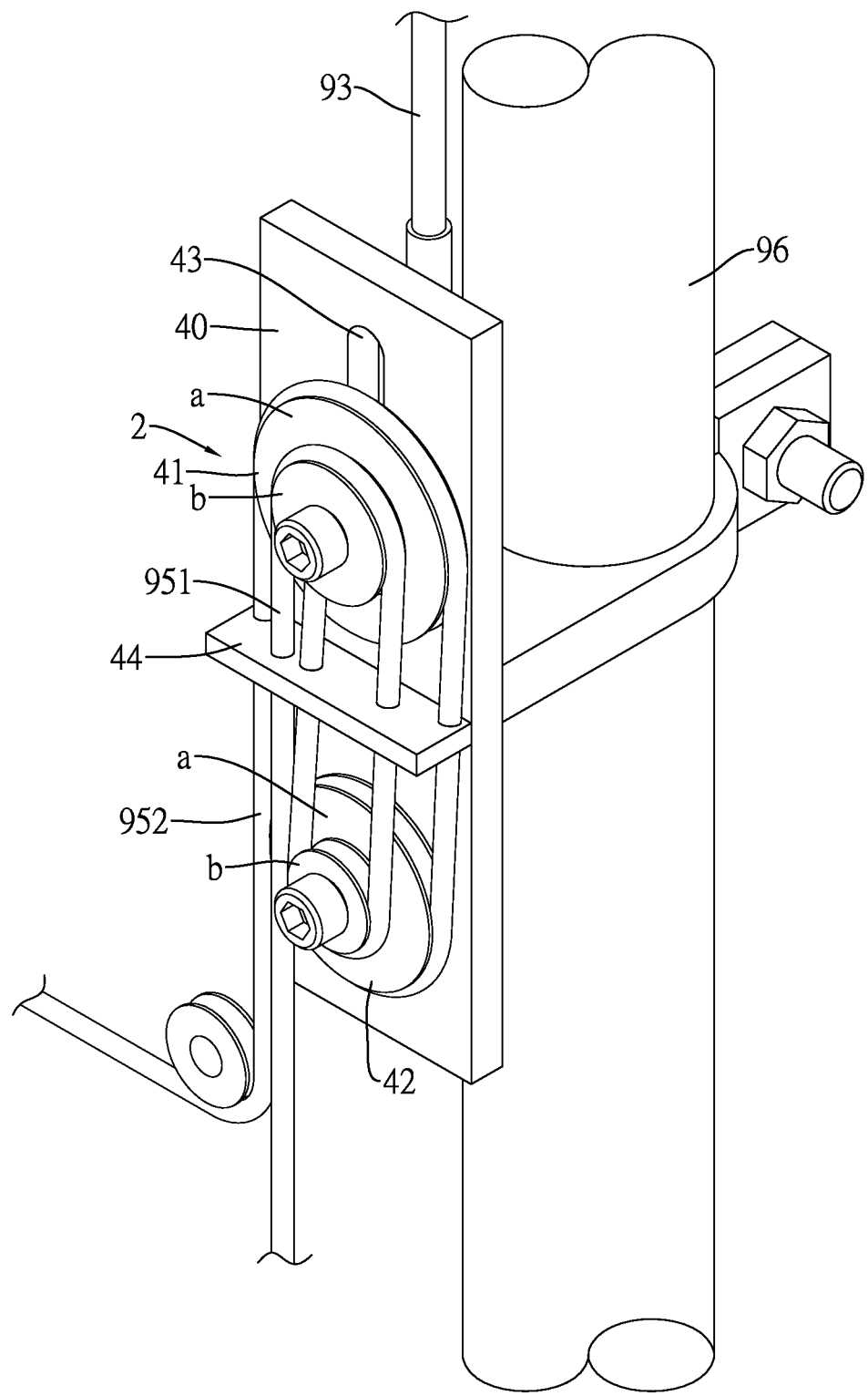
FIG. 6 is a perspective view showing the second embodiment of the present invention.
Figure 7:
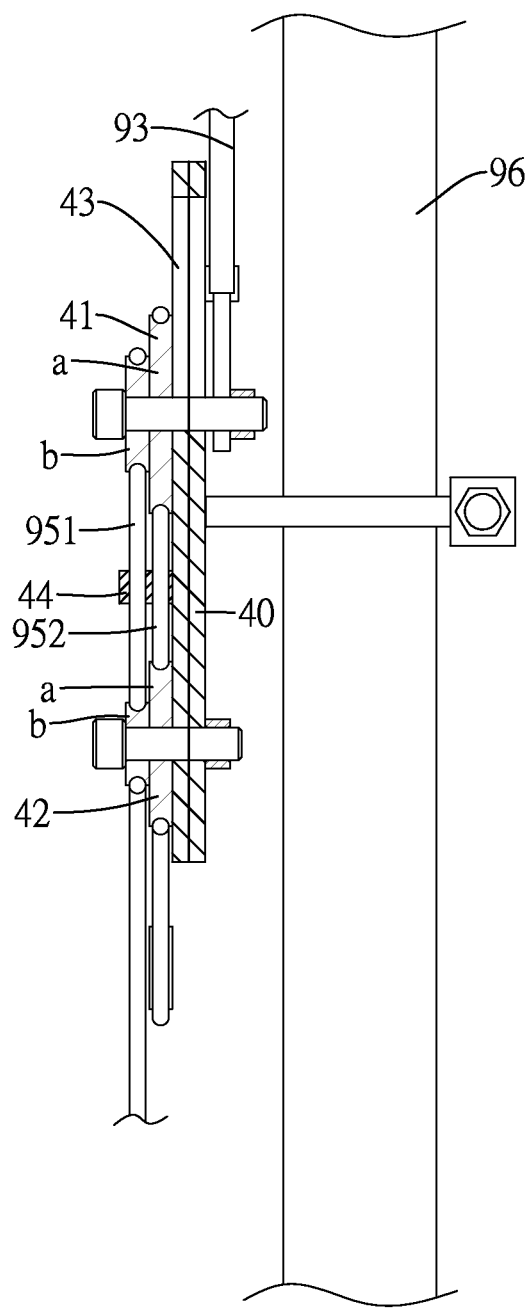
FIG. 7 is a sectional view of the second embodiment of the present invention.

FIGS. 6 and 7 disclose an another embodiment of the present invention, wherein the safety braking system 2 comprises a holding base 40 fixed to the head tube 96, and the holding base 40 has an upper roller 41 and a lower roller 42. The lower roller 42 can be set to be a stationary roller or movable downwardly. The upper roller 41 is movable, relative to the lower roller 42, along the channel 43 of the holding base 40. The brake cable 93 of the brake lever is directly connected to the upper roller 42. When the brake lever is applied, the brake cable 93 pulls the upper roller 42 to move upwardly. Each of both the upper and the lower rollers 41, 42 includes a larger wheel "a" and a smaller wheel "b", each have a groove along its edge. Both of the larger wheels "a" hold a lead cable 952 of the rear brake and both of the smaller wheels "b" hold a lead cable 951 of the front brake. Both of the lead cables 951, 952 pass through a lead cable holding frame 44.

Figure 8:
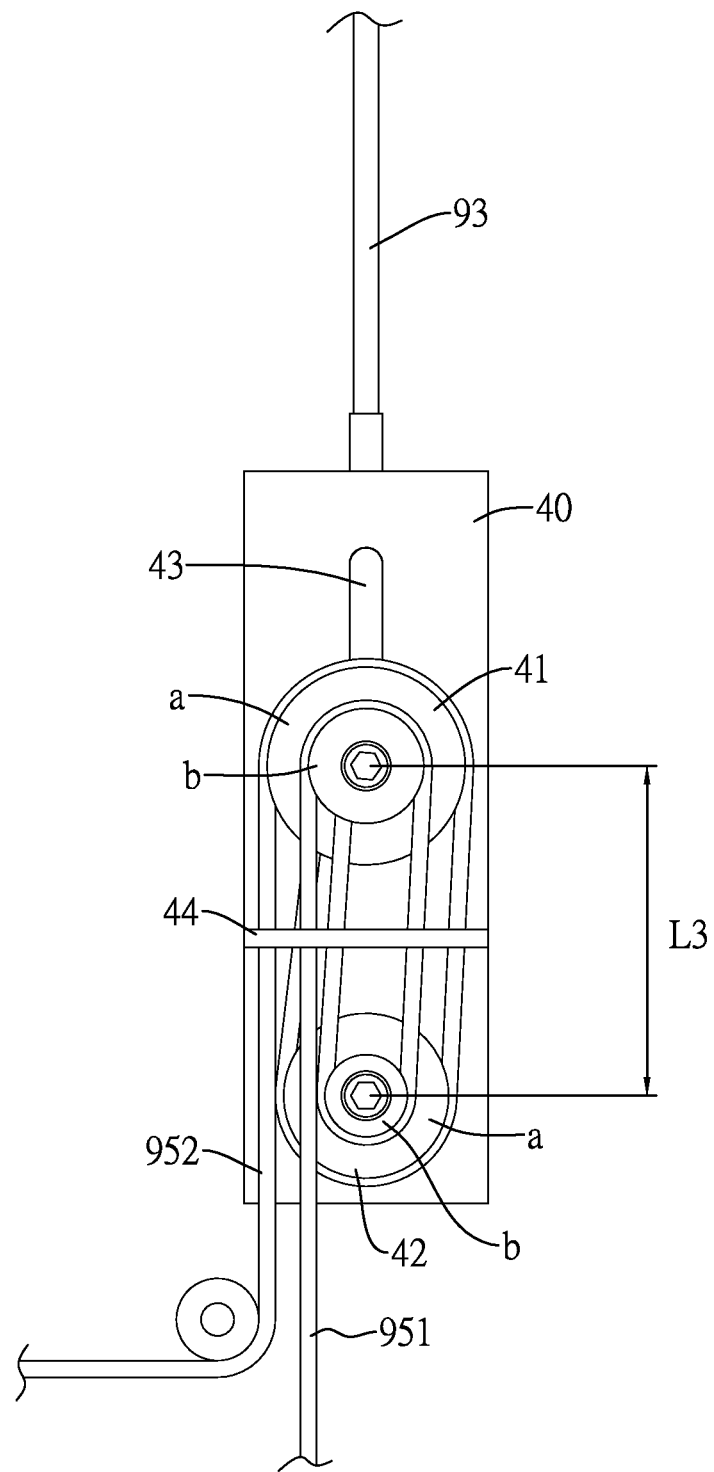
FIG. 8 is a plan view of the second embodiment of the present invention.
Figure 9:
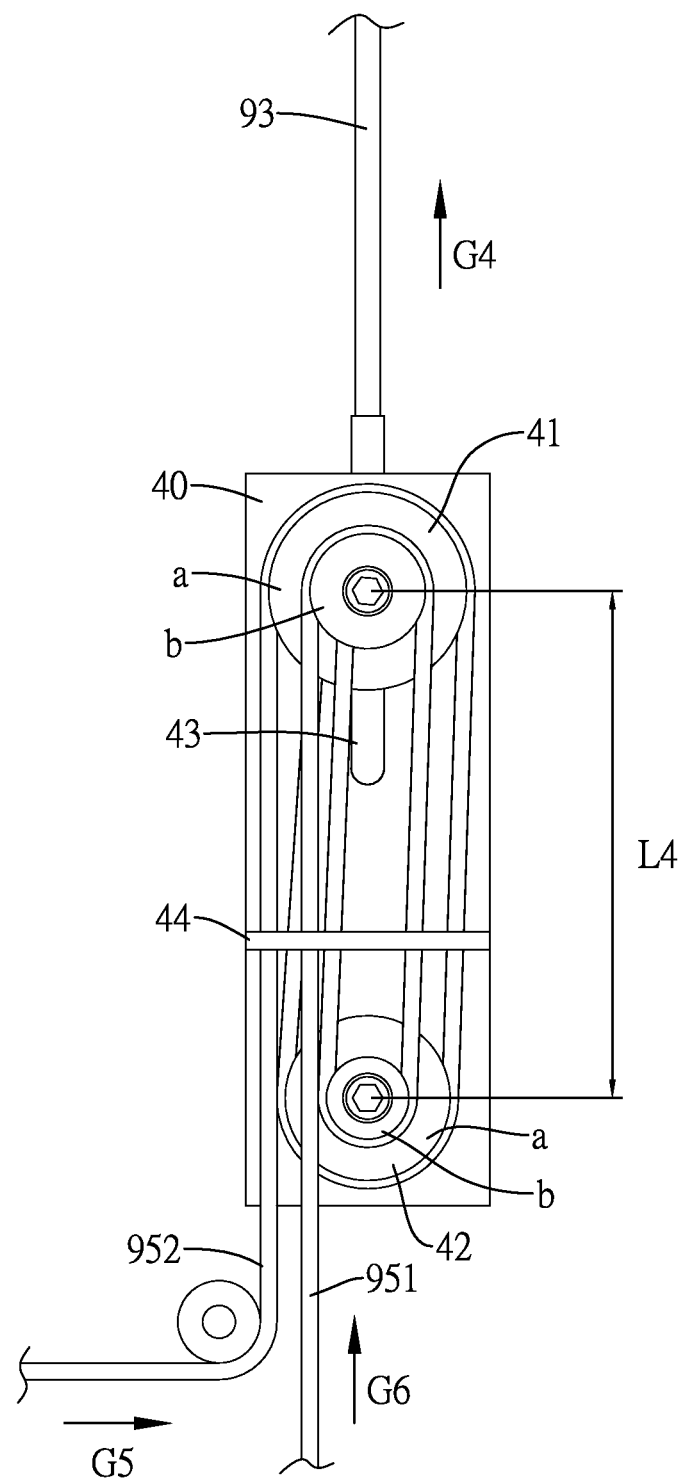
FIG. 9 is a schematic view showing the operating status of the second embodiment of the present invention.

As shown in FIGS. 8 and 9, when the brake cable 93 connected to the brake lever 92 is not yet pulled, a relative distance between both centers of the upper and the lower rollers 41, 42 is designated as L3. When the brake cable 93 is pulled in the direction marked by an arrow G4 as shown in FIG. 9, a braking force is created, the upper roller 41 moves upward for the relative distance between both centers of the upper and the lower rollers 41, 42 is increased up to L4, and the braking force is transferred to both lead cables 951, 952 respectively of the front and the rear brakes. In this status, both of the lead cables 952 of the rear brake held by both larger wheels "a" of two rollers 11, 21 and the lead cable 951 of the front brake held by both of the smaller wheels "b" of two rollers 11, 21 create a pull force (as designated by arrows G5 and G6) and the rear wheel brake 942 will first brake the rear wheel before the front wheel brake 941 applying a brake force to the front wheel.

Figure 10:
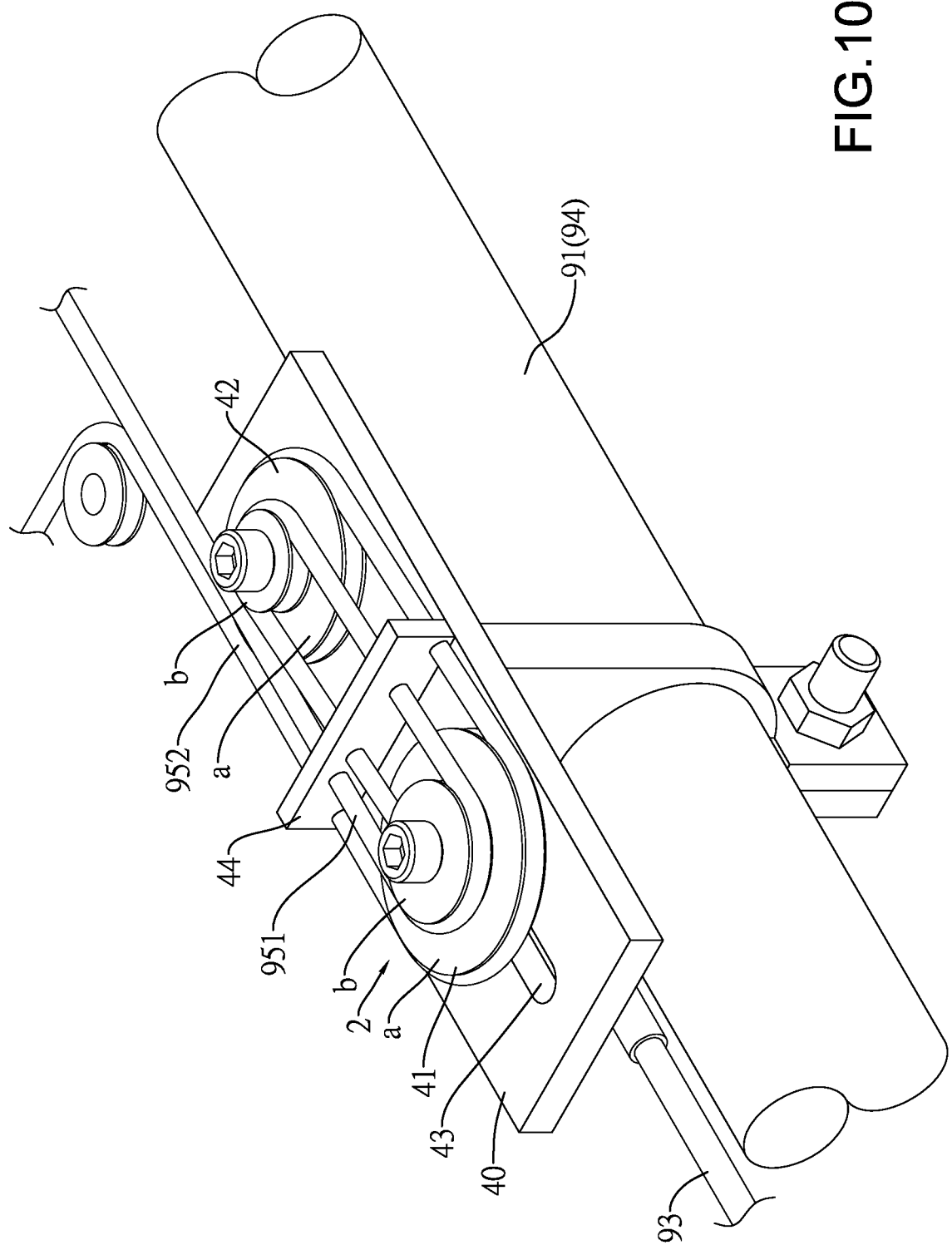
FIG. 10 is a schematic view showing that the second embodiment of the present invention is horizontally mounted.

Alternatively, the safety braking system 2 of the present invention can be installed to a middle section between the right and the left handlebars 91, or to the stem 94 connecting both handlebars and the head tube. The safety braking system 2 can be mounted vertically as shown in FIG. 6, or horizontally as shown in FIG. 10.

The brake cable of the brake lever can also be connected to a rack as the primary mechanism. A gear set is engaged with the rack connected to two rollers. Each roller includes a larger wheel and a smaller wheel with each having a groove along its edge. When the brake cable pulls both rollers on the rack, the distance between both of the centers of two rollers increases and this simplified arrangement of the present invention is also protected by the invention.

Figure 11:
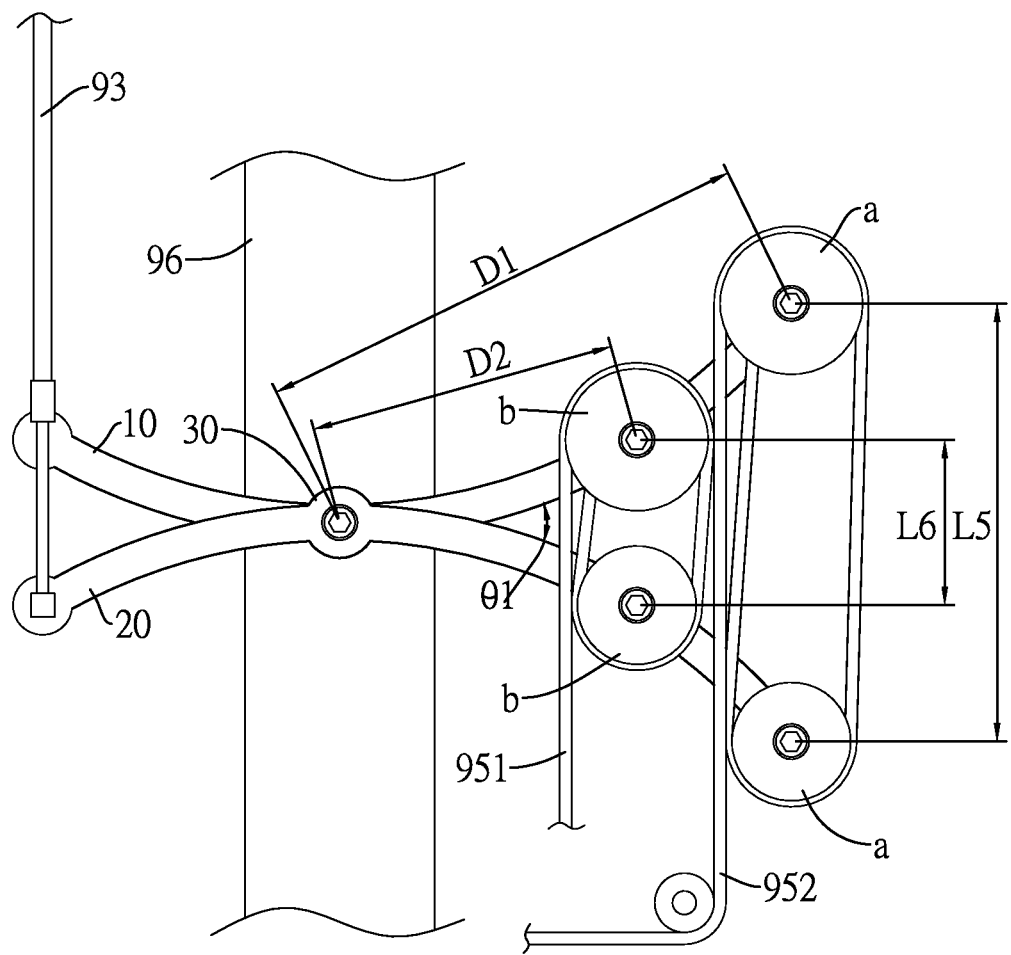
FIG. 11 shows the plan view of the safety braking system of the present invention.
Figure 12:
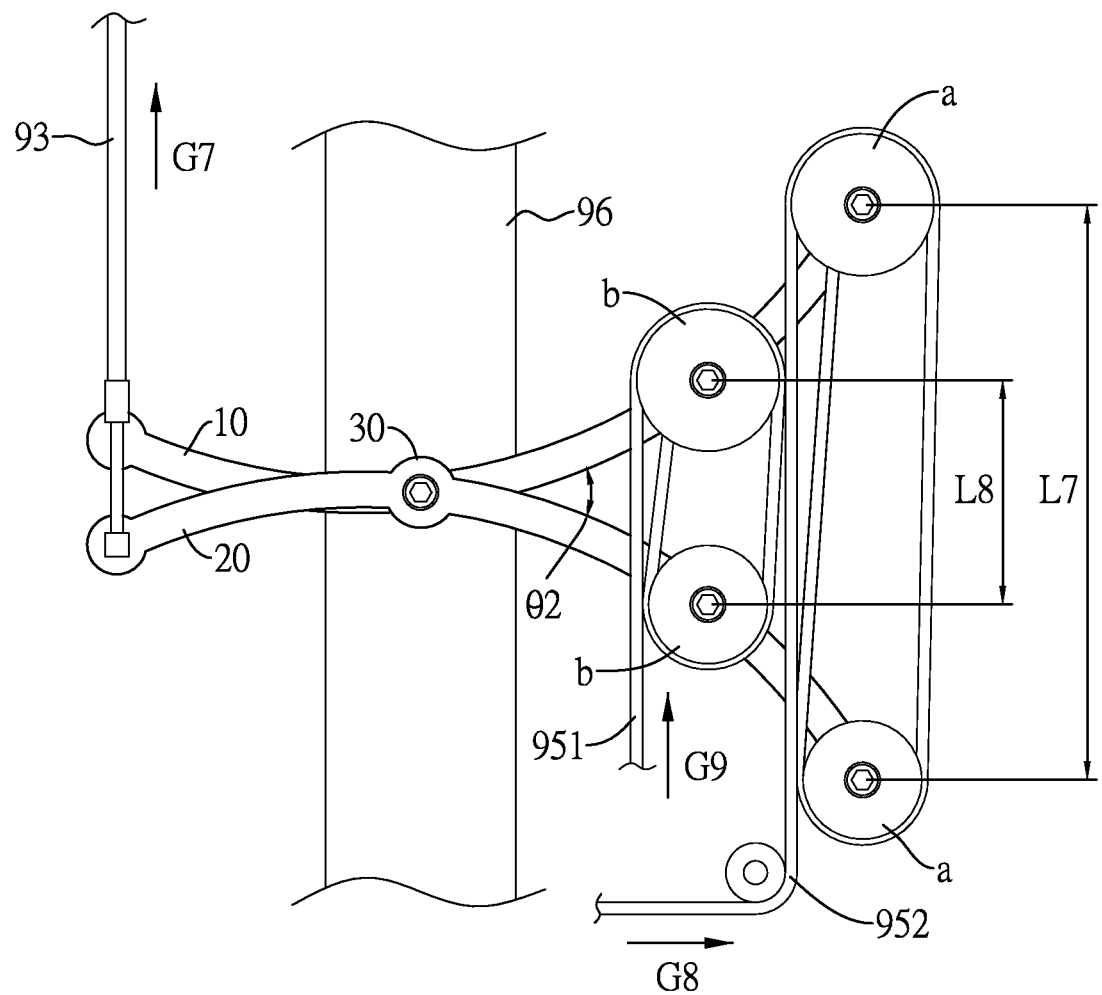
FIG. 12 shows the operational status of the safety braking system of the present invention.

As shown in FIGS. 11 and 12, the safety braking system 2 mounted to the head tube 96 comprises two arc levers 10, 20 pivoted to each other at a pivoting point 30. One side of both arc levers 10, 20 is connected to the brake cable 93 of the brake lever to form the primary mechanism. On the opposite side of the pivoting point 30 are respectively provided with two rollers "a", "b", with each having a groove along its edge, to form the secondary power transmission mechanism. Both wheels "a" hold the lead cable 952 of the rear wheel brake and the two wheels "b" hold the lead cable 951 of the front wheel brake. As illustrated, when the brake cable 93 connected to the brake lever is not pulled, the distance between both centers of two wheels "a" is designated as L5 and the distance between both centers of two wheels "b" is designated as L6. When the brake lever is applied by the rider to pull the brake cable 93 in the direction marked G7 as illustrated in FIG. 12, a braking force is generated for the primary mechanism comprised of both arc levers 10, 20 to move for transferring the braking force to the secondary power transmission mechanism and both distances L5, L6 on the opposite side of both arc levers 10, 20 increase up to that respectively designated as L7 and L8. Meanwhile, both of the lead cable 952 of the rear brake held by both wheels "a" and the lead cable 951 of the front brake held by both wheels "b" create a pull force (as designated by arrows G8 and G9) for the secondary power transmission mechanism to respectively transfer the braking force to the front and the rear brakes. The rear wheel brake 942 will first brake the rear wheel before the front wheel brake 941 applying a brake force to the front wheel. In the preferred embodiment, the distance D1 between the center of the wheel "a" and the pivoting point 30 is greater than D2, a distance between the center of the wheel "b" and the pivoting point 30. According to the law of tangent of trigonometric function:

$$2D_1 \times \text{SIN}\frac{\theta_1}{2} = L5$$

$$2D_2 \times \text{SIN}\frac{\theta_1}{2} = L6$$

Therefore, when $\theta_1$ is enlarged to $\theta_2$ both distances L7, L8 between wheels "a" and wheels "b" are respectively:

$$2D_1 \times \text{SIN}\frac{\theta_2}{2} = L7$$

$$2D_2 \times \text{SIN}\frac{\theta_2}{2} = L8$$

The distance increased thus is:

$$L7 - L5 = 2D_1 \times \left(\text{SIN}\frac{\theta_2}{2} - \text{SIN}\frac{\theta_1}{2}\right)$$

$$L8 - L6 = 2D_2 \times \left(\text{SIN}\frac{\theta_2}{2} - \text{SIN}\frac{\theta_1}{2}\right)$$

Accordingly, when D1 is greater than D2, the distance increased between the two wheels "a" is greater than that between two wheels "b". That is, amount of change in the length of the lead cable 952 is greater than that of the lead cable 951, so that when both brake levers are pulled at the same time, the rear wheel brake operates first.

Figure 13:
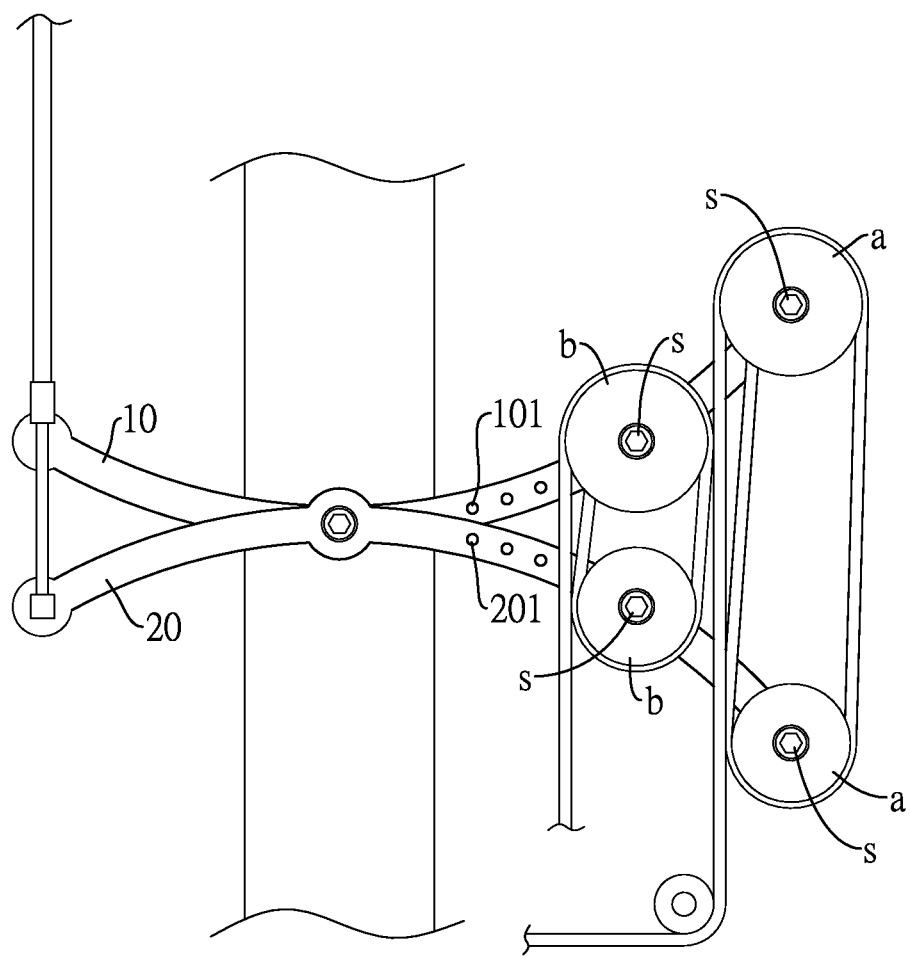
FIG. 13 is a schematic view showing the locating mechanism in the present invention.
Figure 14:
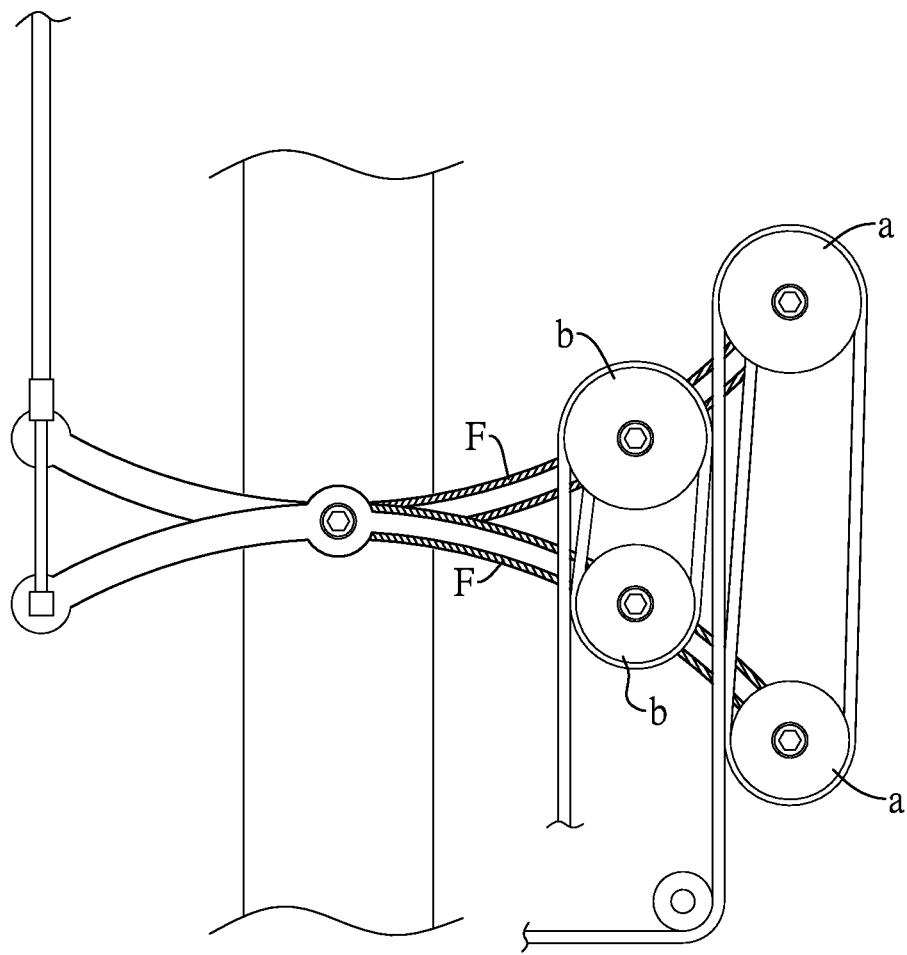
FIG. 14 is a schematic view showing another locating mechanism in the present invention.
Figure 15:
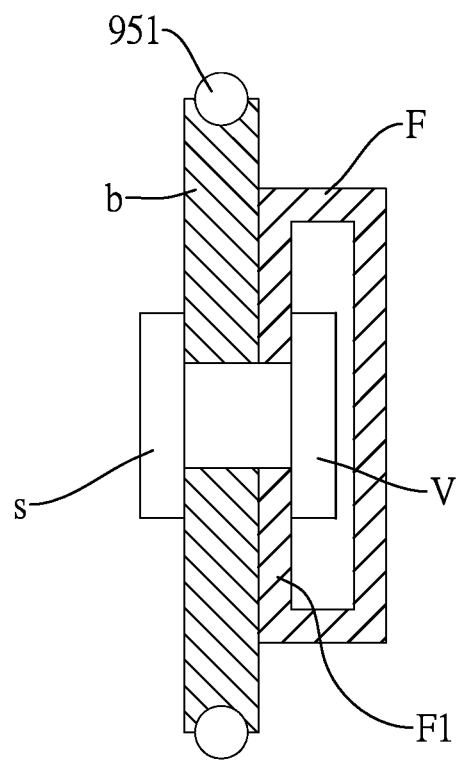
FIG. 15 is a cross sectional view of the locating mechanism in FIG. 14.

Referring to FIGS. 13 and 14, a locating mechanism is further disposed to both arc levers 10, 20 to allow both wheels "a", "b" to be adjusted their positions on the arc levers as desired. As shown in FIG. 13, multiple holes 101, 201 are provided on both arc levers 10, 20, and a locking member S penetrates through holes 101, 201 on both arc levers 10, 20 and the wheels "a", "b" to secure both arc levers 10, 20 to those wheels "a", "b". The locking member S can be a screw or a quick-release member. Alternatively, as shown in FIGS. 14 and 15, each of the arc levers has a chute F and a slide V is connected to the wheels, the slide V is engaged with the chute F. When the locking member S is released, the wheel slides in the chute F to a preset location, and the locking member S pulls closer to the slide V and the wheels to compress the wing F1 of the chute F so to locate the arc levers at those wheels. The locking member S can be a screw or a quick-release member. With the locating mechanism, the rider may adjust the position of each wheel having a groove along its edge according to his/her particular riding behavior to achieve the optimal braking effects.

Figure 16:
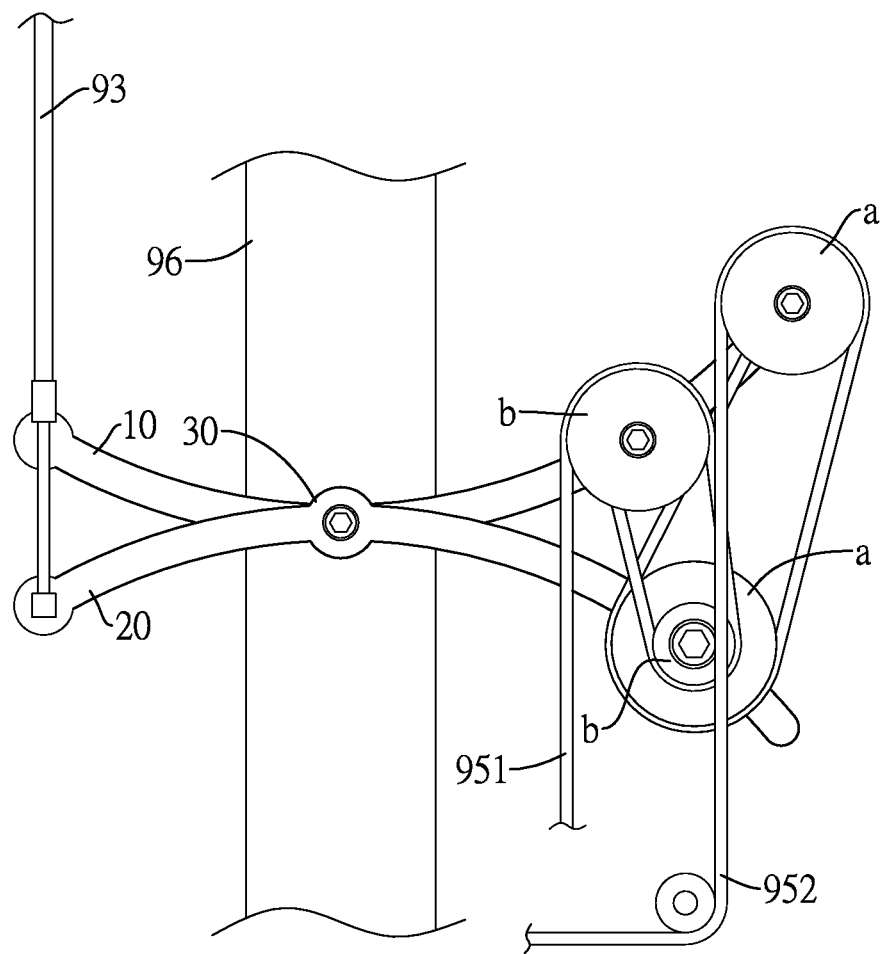
FIG. 16 is a front view showing another embodiment of the safety braking system of the present invention.
Figure 17:
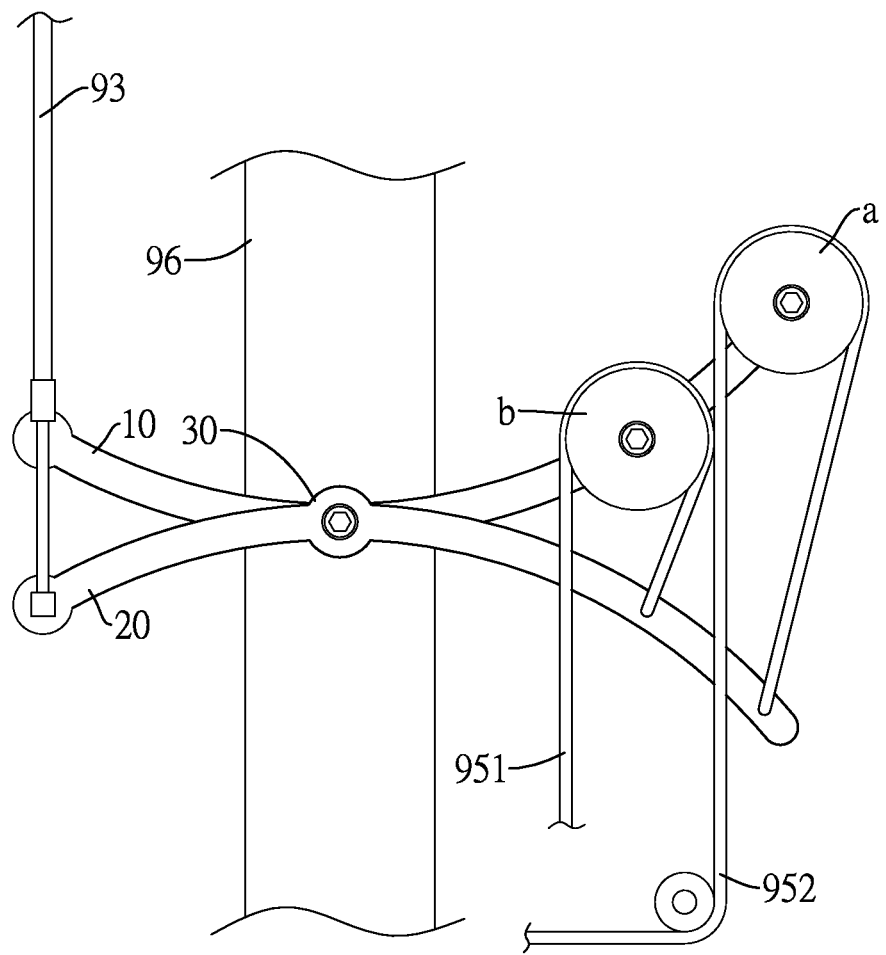
FIG. 17 is a front view showing yet another embodiment of the safety braking system of the present invention.
Figure 18:
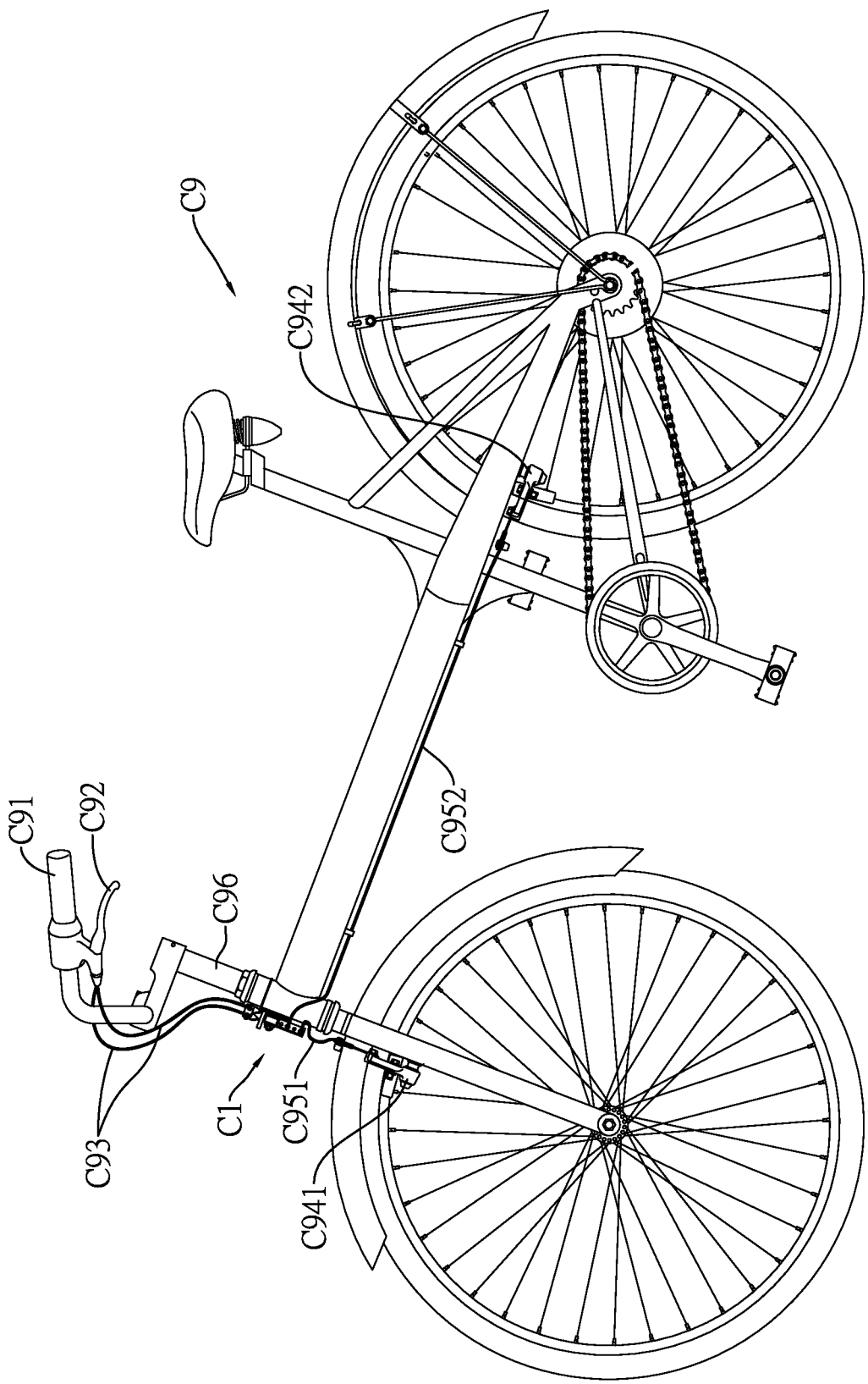
FIG. 18 shows that the safety braking system of the present invention is equipped on a bicycle.

Referring to FIG. 16, the wheels "a" and "b" on the arc levers are locked at a point (concentrically) to achieve purpose of having the amount of change of the lead cable 952 be greater than that of the lead cable 951 thus to allow the rear wheel brake connected to the lead cable 952 to act first. Furthermore, as shown in FIG. 17, the two respective ends of the lead cable 951 and the lead cable 952 are directly fixed to the arc lever 20 to achieve the same purpose. The preferred embodiment illustrated in FIGS. 16 and 17 can be provided with the locating mechanism as shown in FIGS. 13, 14, and 15 to achieve the purpose of adjustment.

The safety braking system 2 of the present invention can also be mounted to a proper middle section between both handlebars 91, or on the stem 94 that connects both handlebars 91, or the head tube vertically or horizontally.

FIGS. 18 to 22 show another embodiment of the safety braking system C1 of the present invention which is mounted to a bicycle, a motorbike or a linear two-wheel vehicle C9 which comprises the right brake lever C92 and the left brake lever C92, and the front and the rear wheel brakes C941, C942. The safety braking system is connected between the right and left brake levers C92 and the front and the rear wheel brakes C941, C942, whenever either the right brake lever C92 or the left brake lever C92 is pulled, the safety braking system C1 controls the rear wheel brake C942 to be activated before the front wheel brake C941 to be activated. The safety braking system C1 of the present invention can be installed to the stem C96.

The safety braking system C1 comprises two plates C10, C11 which are the primary mechanism, and the two plates C10, C11 each have a through hole C100/C110. A transmission portion C12 extends through the through holes C100, C110 so as to connect the two plates C10, C11 which are able to move relative to each other. The plates C10, C11 each have a brake cable hole C1011/C1111 and a brake cable positioning portion C101/C111 which is located at an end where the through holes C100/C110 are defined. The brake cables C93 of the left and right brake levers C92 extend through the two brake cable holes C1011, C1111 and are fixed to the brake cable positioning portions C101, C111 to connect the two plates C10, C11. One of the brake cables C93 extends through the brake cable hole C1011 first and then the brake cable hole C1111. The other brake cables C93 extends through the brake cable hole C1111 and then the brake cable hole C1011. Multiple lead cable holes C102 (referring to FIG. 21 and located at the corresponding position to the lead cable hole C112) and C112 are defined in the other end of the plates C10, C11 and located opposite to the through holes C100, C110. The lead cable holes C102, C112 are located in radial direction relative to the through holes C100, C110, wherein the brake cable C951 of the front wheel brake 941 extends through the lead cable holes C102, C112 that are located close to the through holes C100, C110. The brake cable C952 of the rear wheel brake 942 extends through the lead cable holes C102, C112 that are located remote from the through holes C100, C110 so as to connect the two plates C10, C11 and to form the secondary power transmission mechanism.

Figure 21:
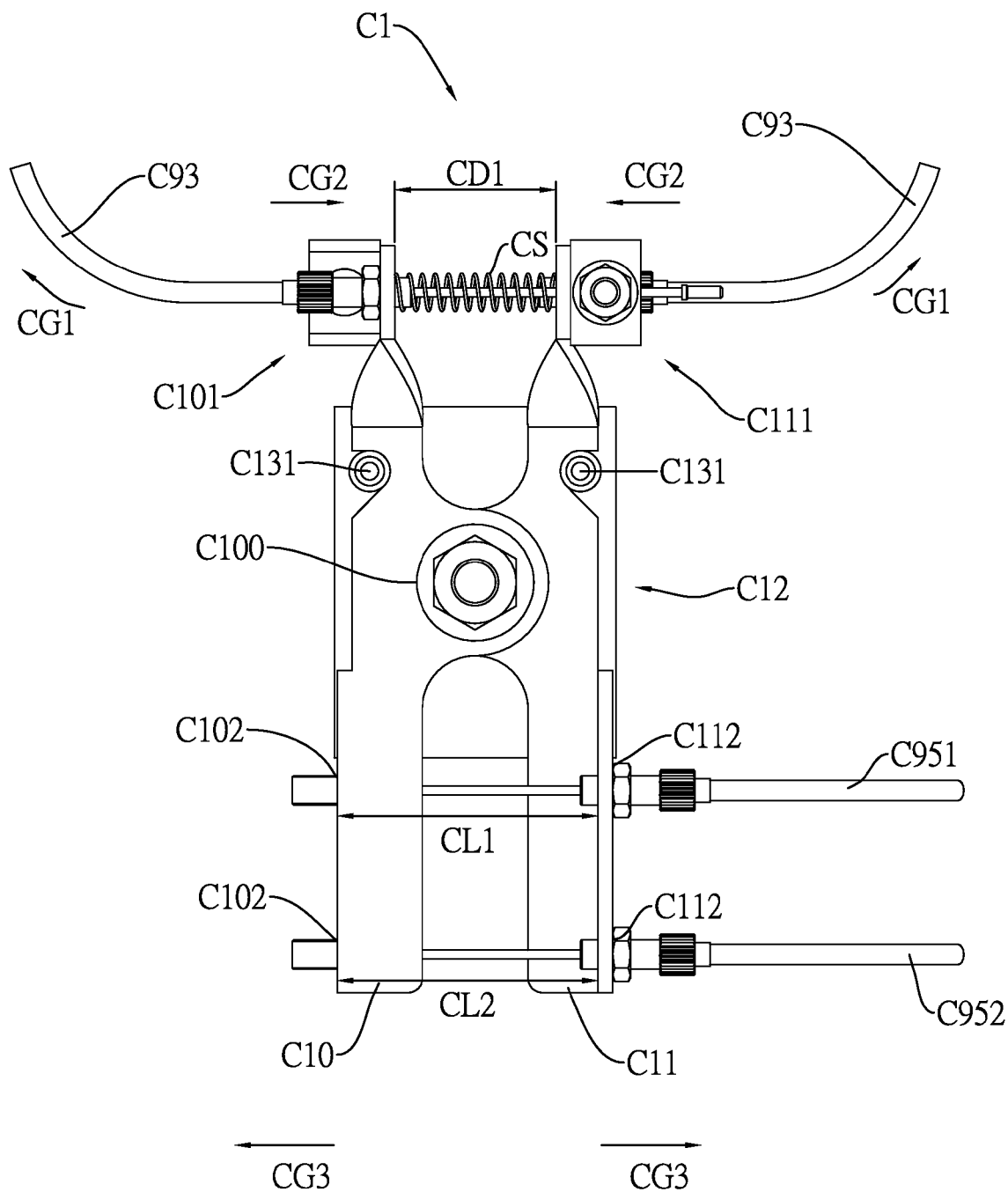
FIG. 21 is a plane view to show of the another embodiment of the safety braking system of the present invention.
Figure 22:
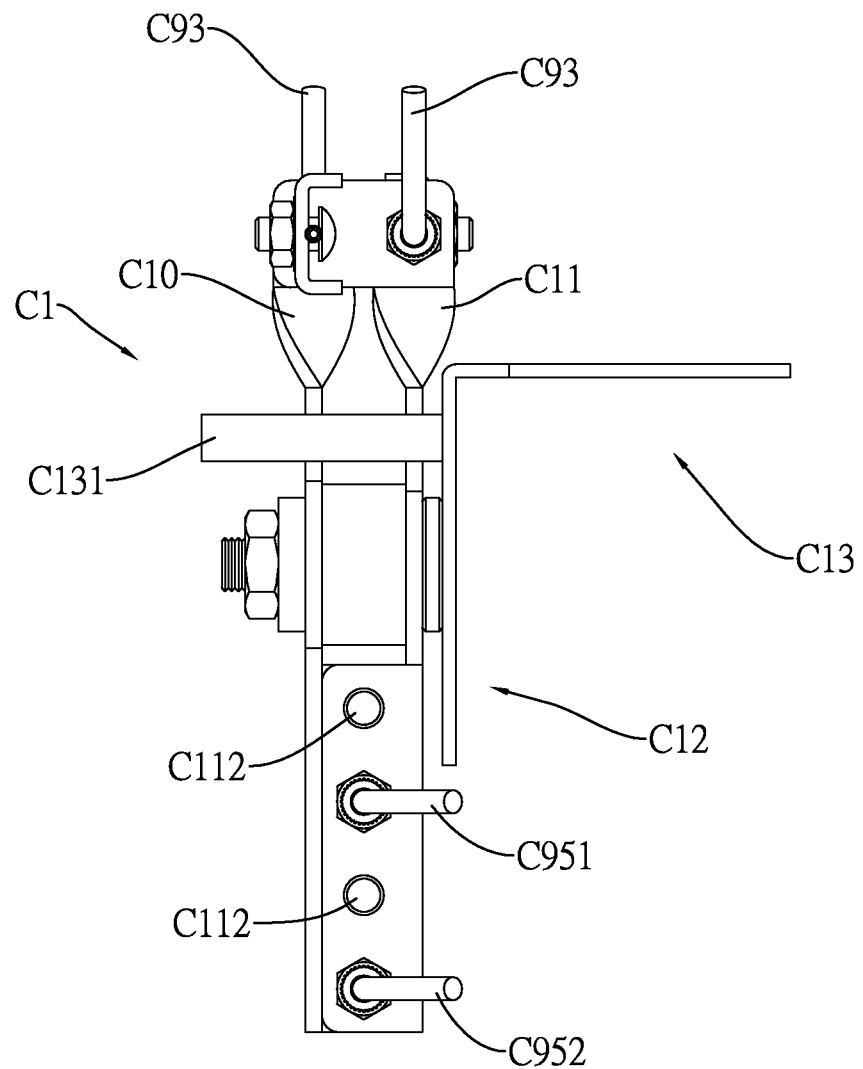
FIG. 22 is a side view to show the embodiment disclosed in FIG. 21.
Figure 23:
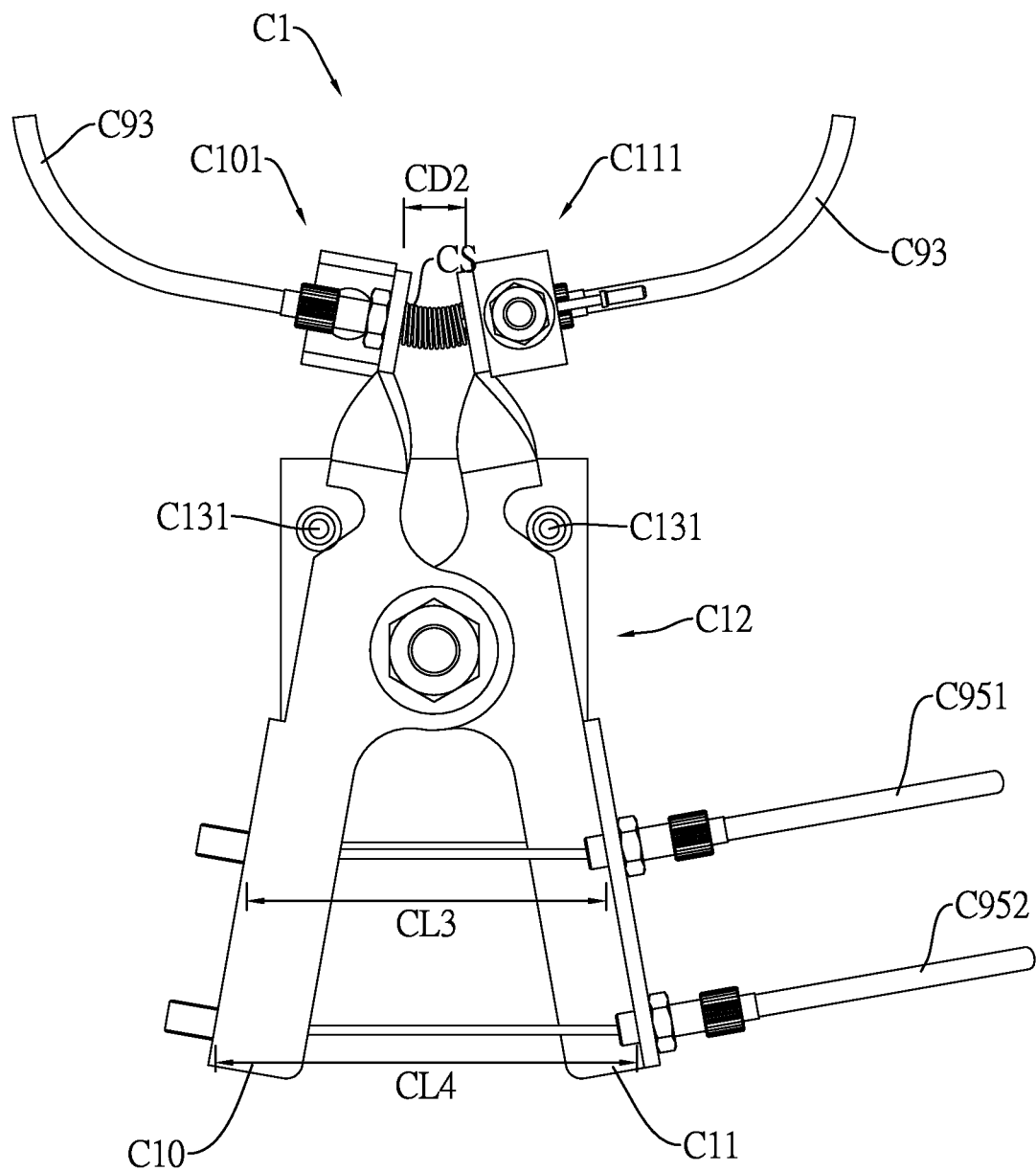
FIG. 23 shows the operational status of the embodiment disclosed in FIG. 21.

As shown in FIGS. 21 and 23, when the brake cable C93 is pulled in the direction designated by the arrowhead CG1 in FIG. 21, the brake cable positioning portions C101, C111 of the two plates C10, C11 are moved toward each other as shown in the direction designated by the arrowhead CG2 in FIG. 21. The two plates C10, C11 are the primary mechanism. In the meanwhile, the distance of the two respective ends of the plates C10, C11 that have the lead cable holes C102, C112 is increased as shown in the direction designated by the arrowhead CG3 in FIG. 21. After the lead cable C93 is applied the force, the distance CD1 between the two the brake cable positioning portions C101, C111 is shortened to be CD2. The distances CL1, CL2 are pulled in different length because the distance from the through holes C100, C110 are different. The longer distance the distance CL1/CL2 from the through holes C100, C110, the longer that they are pulled. This is to say, the CL4 is larger than the CL3. The length that the lead cable C951 is pulled is shorter than that of the lead cable C952. The lead cable C951 is connected to the front wheel brake C941 and forms the second power transmission mechanism. The lead cable C952 is connected to the rear wheel brake C942. Therefore, the rear wheel brake C942 will be first activated and then the front wheel brake C941 is activated in sequence.

Figure 24:
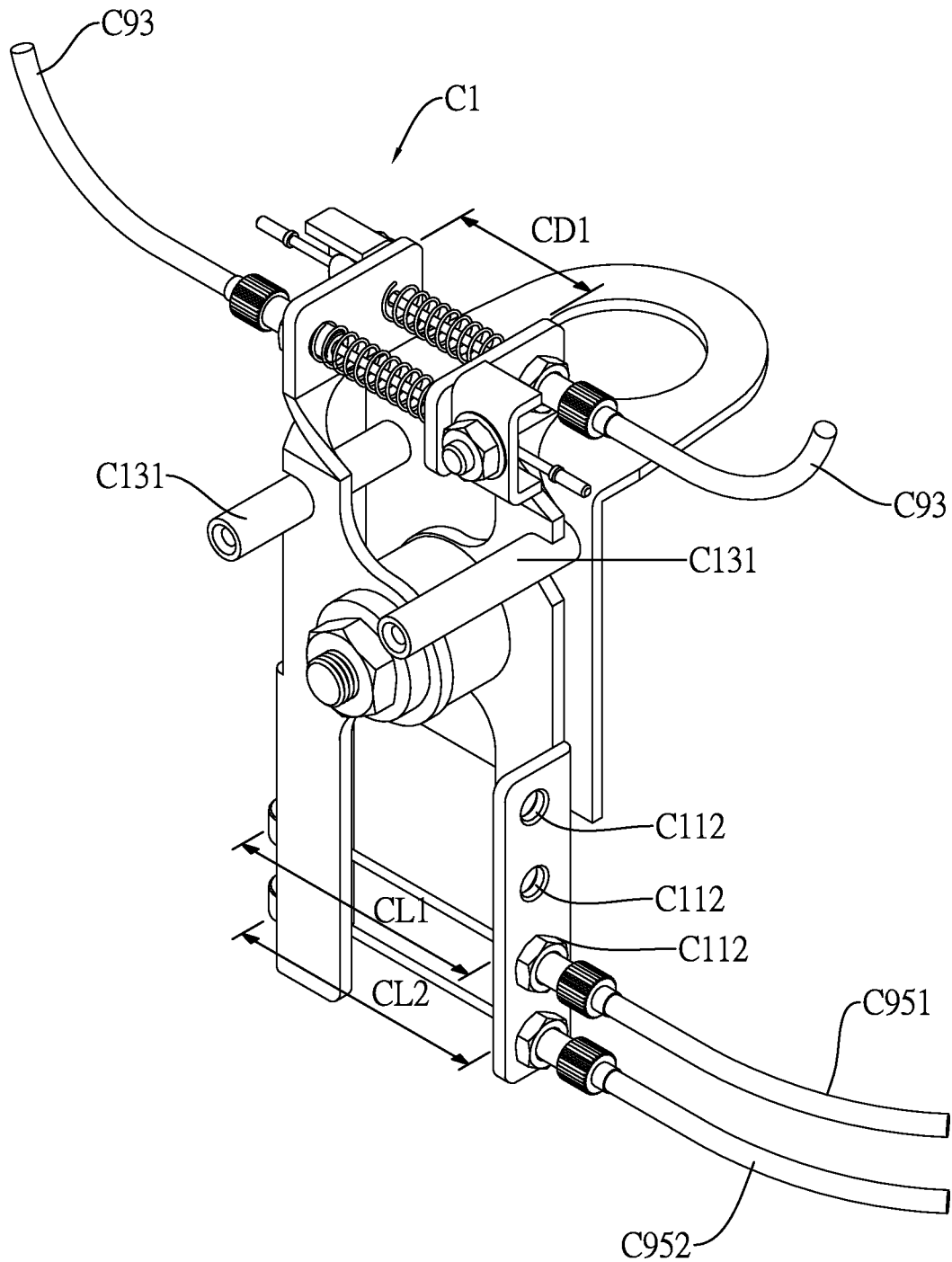
FIG. 24 shows another embodiment of the safety braking system of the present invention.
Figure 25:
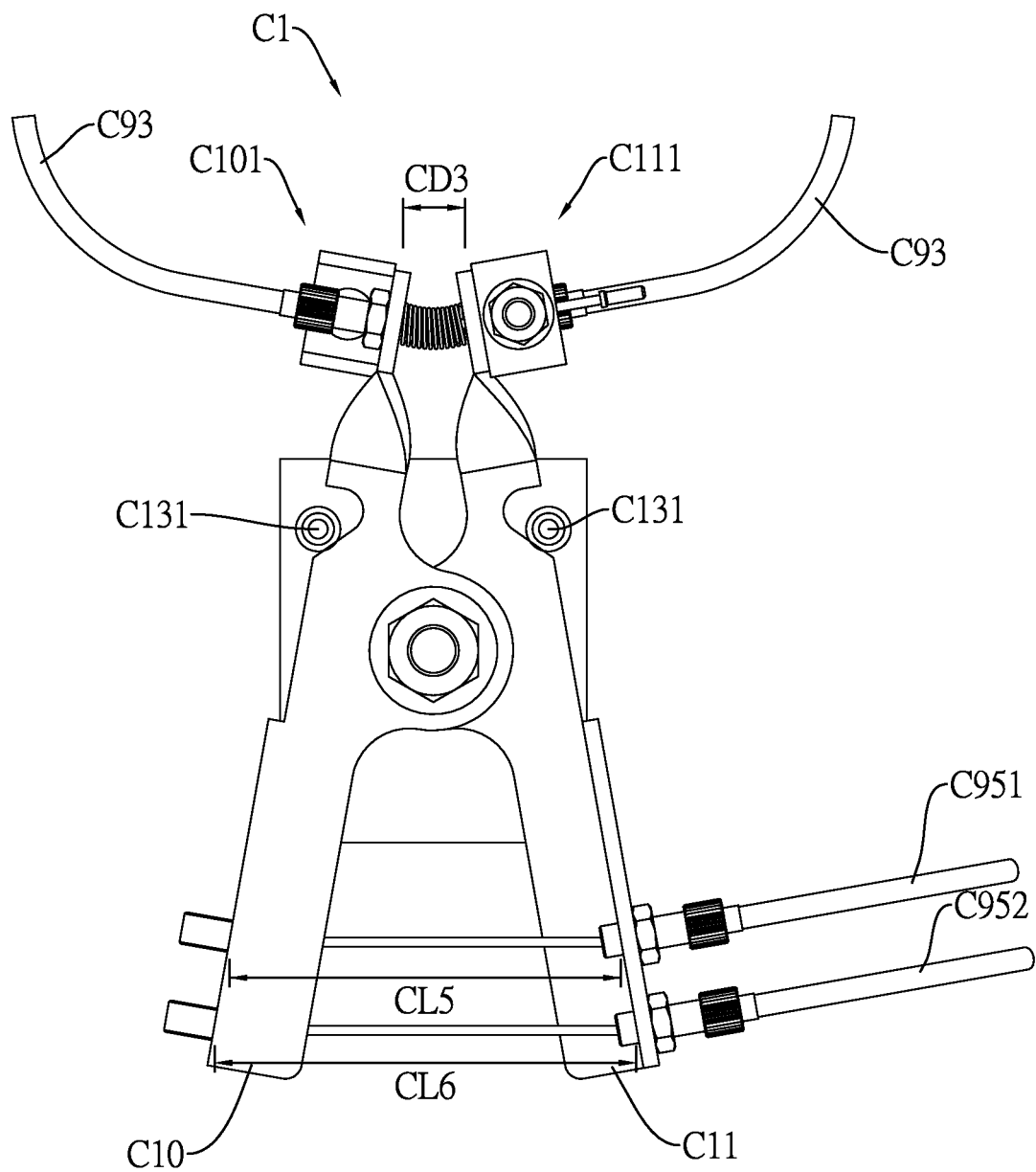
FIG. 25 shows the operational status of the safety braking system of the present invention in FIG. 24.

When the rider wants to adjust the time delay between the front and rear wheel brakes C941, C942, as shown in FIG. 24, the position that the lead cable C951 of the front wheel brake C941 relative to the lead cable holes C102, C112, as shown in FIG. 25, the distance between the brake cable positioning portions C101, C111 will be adjusted to be "CD3". The distance of the lead cables C951, C952 between the two plates C10, C11 is increased to be CL5, CL6. The CL5 is longer than the CL3, this means that the time delay between the actions of the front wheel brake and the rear wheel brake is shortened.

As shown in FIGS. 19 to 25, two springs CS are respectively connected between the two brake cable positioning portions C101, C102 and located around the two brake cables C93 so as to buffer the distance of compression of the brake cable positioning portions C101, C111.

Figure 19:
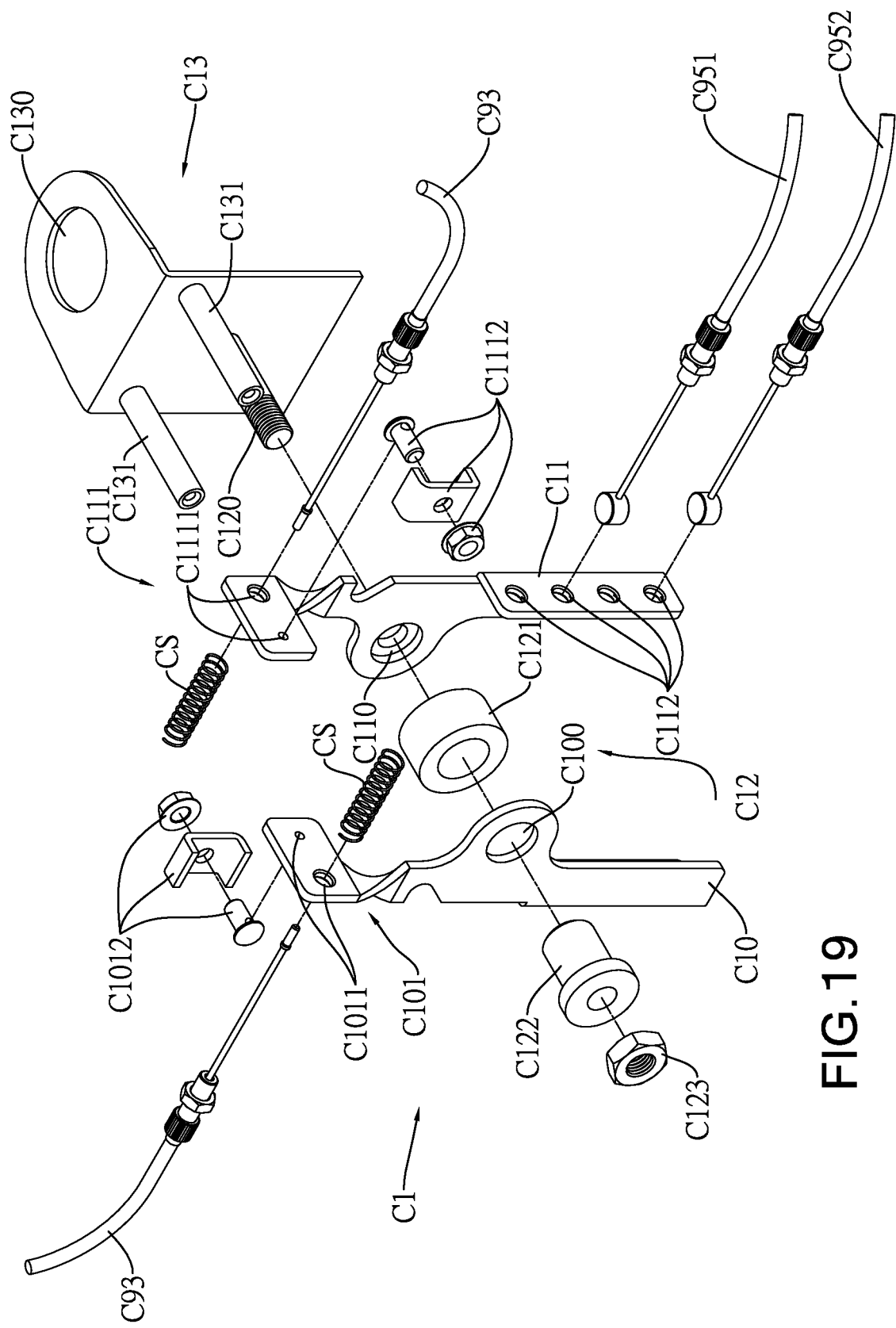
FIG. 19 is an exploded view to show another embodiment of the safety braking system of the present invention.
Figure 20:
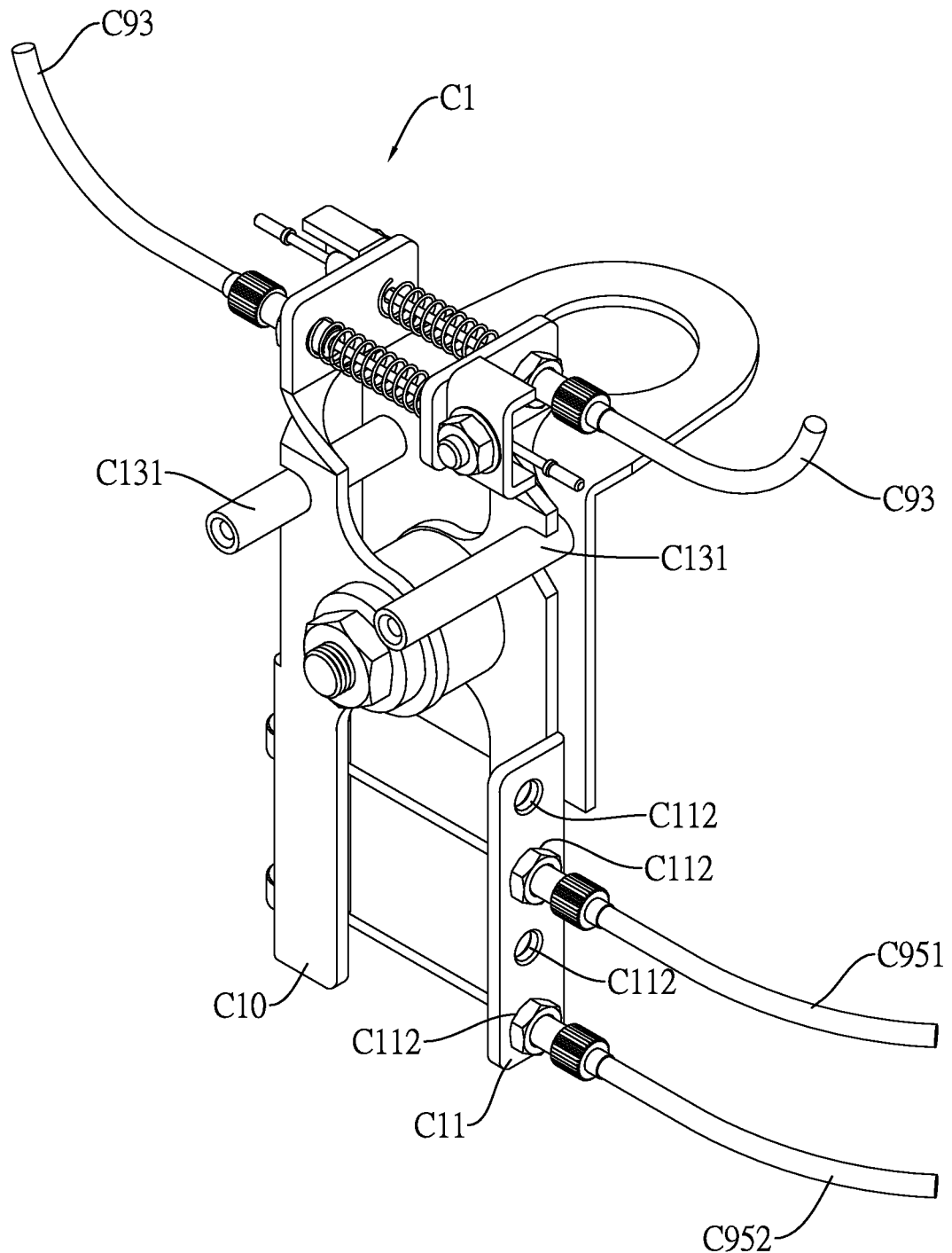
FIG. 20 is a perspective view to show the another embodiment of the safety braking system of the present invention.

As shown in FIG. 19, the transition portion C12 has a connection rod 0120, a sleeve C122, a washer C121, and a nut C123, wherein the sleeve C122 extends through the washer C121 and the connection rod C120 extends through the sleeve C122 and the washer C121, and the nut C123 is fixed to the connection rod C120 to connect the two plates C10, C11.

Besides, the connection rod C120 has a fixing member C13 at a distal end thereof and the fixing member C13 has a connection hole C130 so as to be connected to the linear two-wheel vehicle.

The fixing member C13 further has at least one positioning rod C131 to control positions of the two plates C10, C11 and prevent the two plates C10, C11 to be operated stably.

Figure 26:
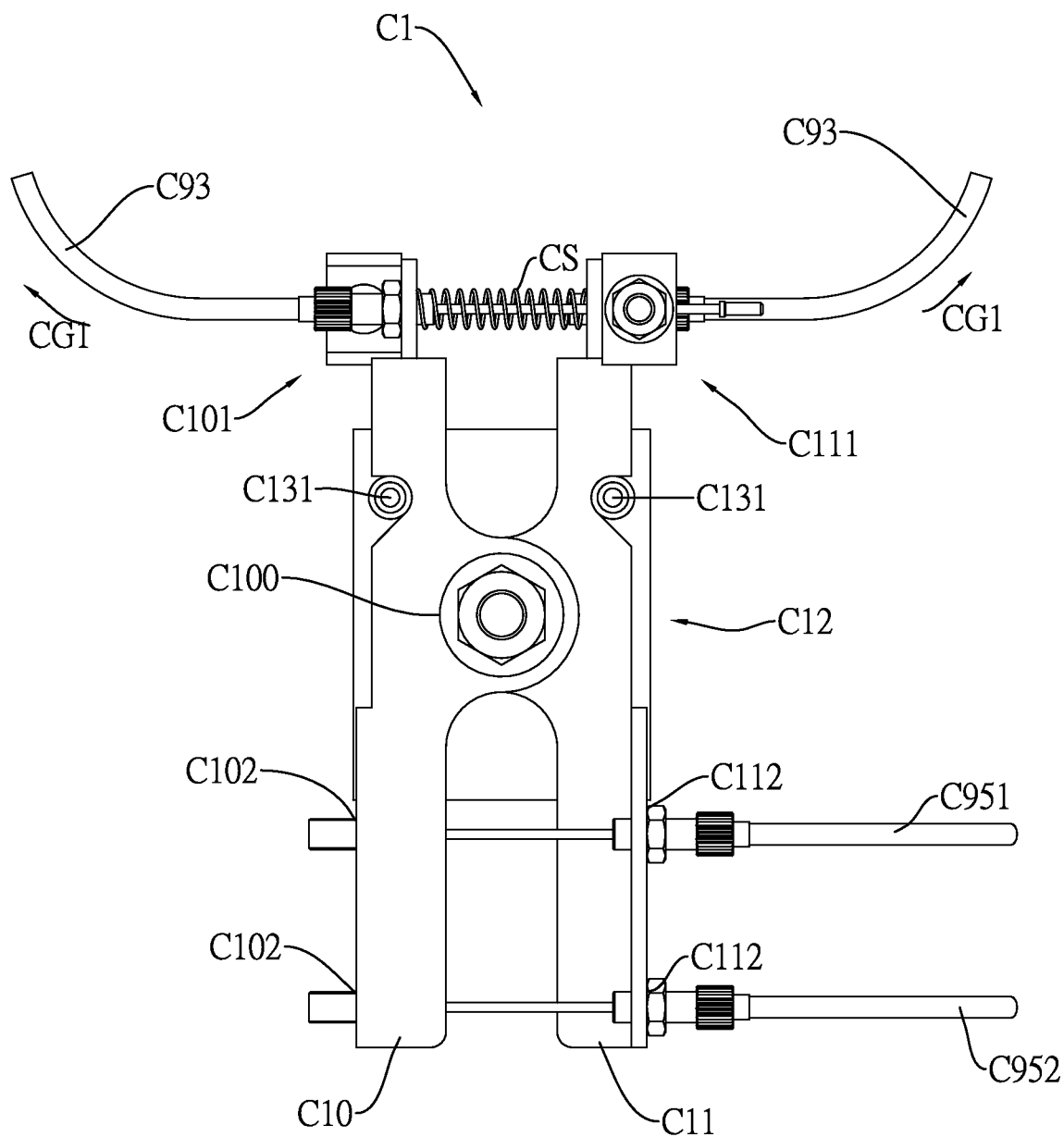
FIG. 26 shows another operational status of the safety braking system of the present invention in FIG. 24.

FIG. 26 shows another embodiment of the embodiment disclosed in FIG. 21, wherein the connections between the two plates C10, C11 and the brake cable positioning portions C101, C111 are different. FIG. 21 discloses a substantially spiral outer appearance and FIG. 26 shows that the plates C10, C11 are directly connected to the brake cable positioning portions C101, C111 without the spiral outer appearance.

Figure 27:
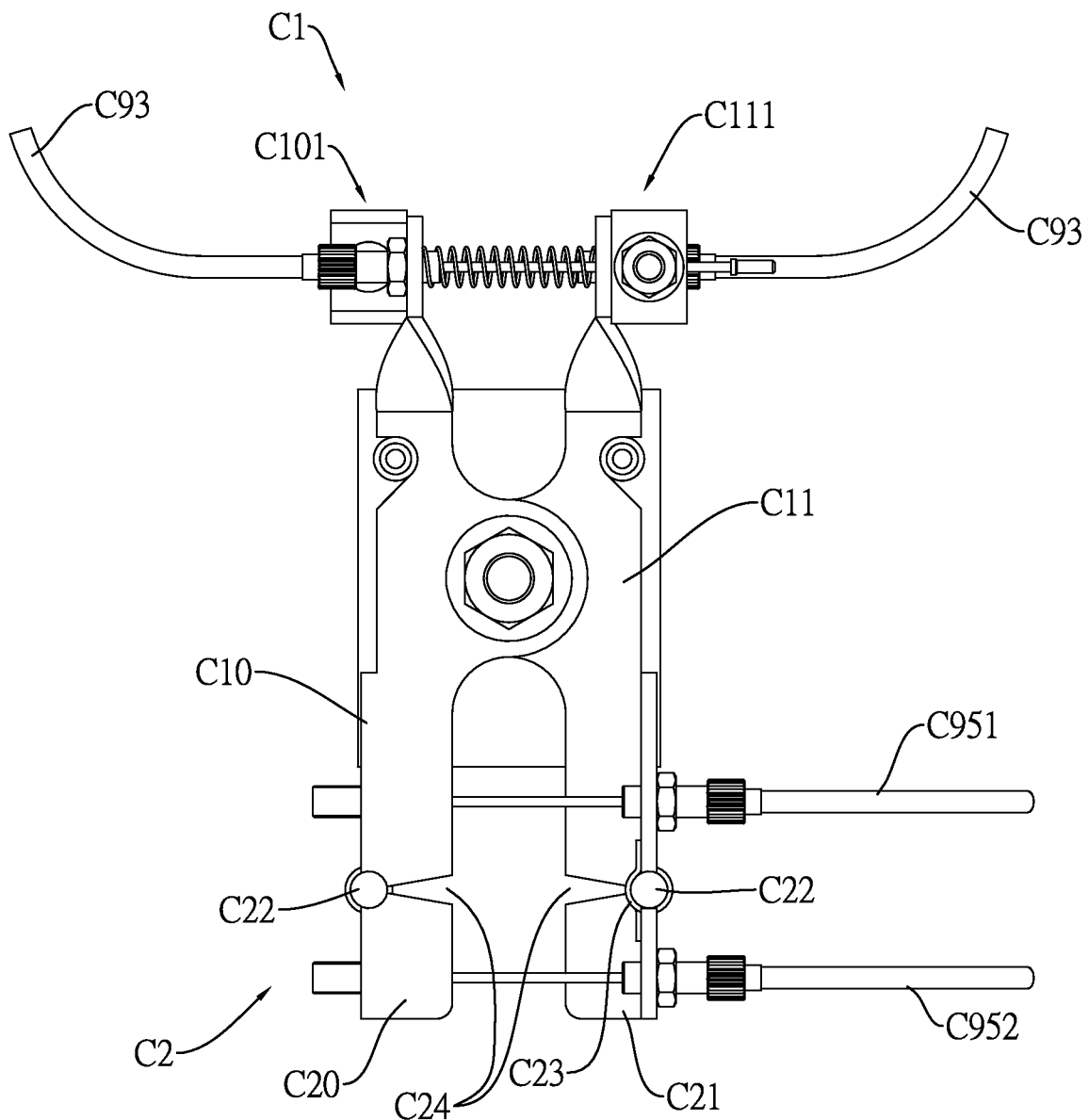
FIG. 27 shows another embodiment of the safety braking system of the present invention which is cooperated with the movable unit.
Figure 28:
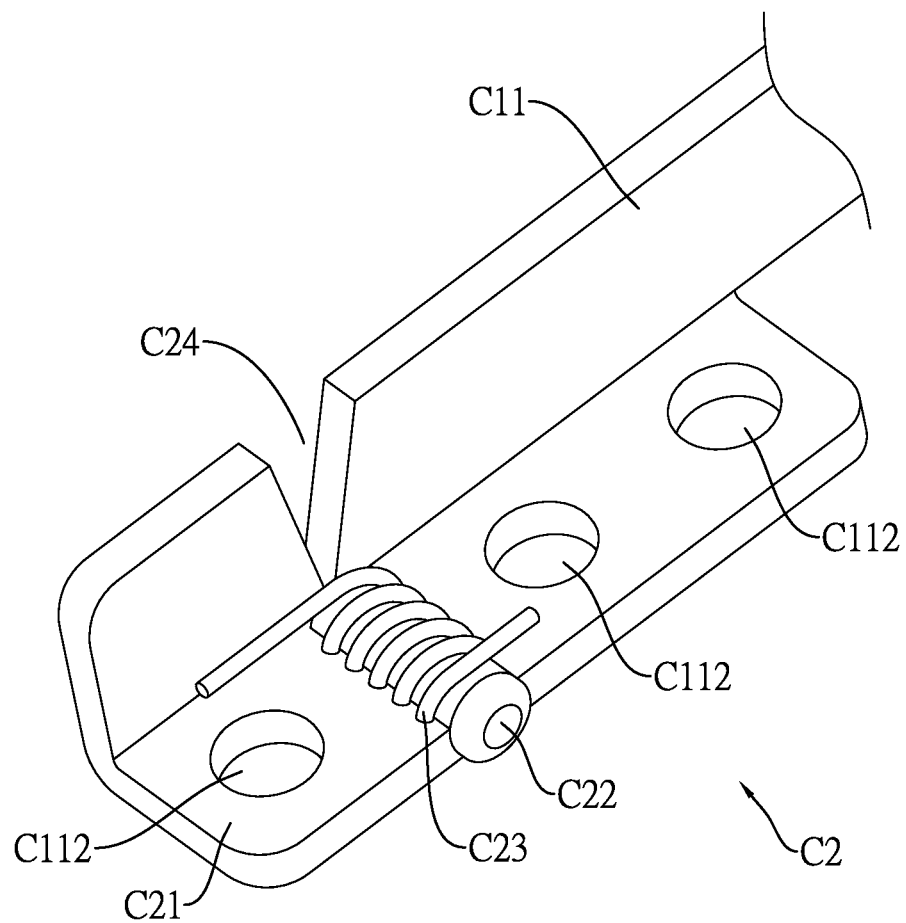
FIG. 28 is an enlarged view to show the first embodiment of the safety braking system of the present invention.

The two plates C10, C11 have a movable unit C2, as shown in FIGS. 27 and 28, the movable unit C2 comprises two movable plates C20, C21 which are pivotably connected to the ends having the lead cable holes C102, C112 of the two plates C10, C11 by two respective pivots C22. The two plates C20, C21 are the primary mechanism.

Two resilient members C23 are respectively connected to pivotal portions between the two plates C10, C11 and the two movable plates C20, C21 to connect the plates C10, C11 and the movable plates C20, C21.

One or more than one lead cable hole C102, C112 is defined through the movable plates C20, C21.

Two gaps C24 are defined in the pivotal portions between the two plates C10, C11 and the two movable plates C20, C21, and the two gaps C24 expand from the pivotal portions.

The lead cable C951 of the front wheel brake C941 extends through the lead cable holes C102, C113 of the plates C10, C11, and the lead cable C952 of the rear wheel brake C942 extends through the lead cable holes C102, C113 of the plates C10, C11 so as to form the secondary power transmission mechanism.

Figure 29:
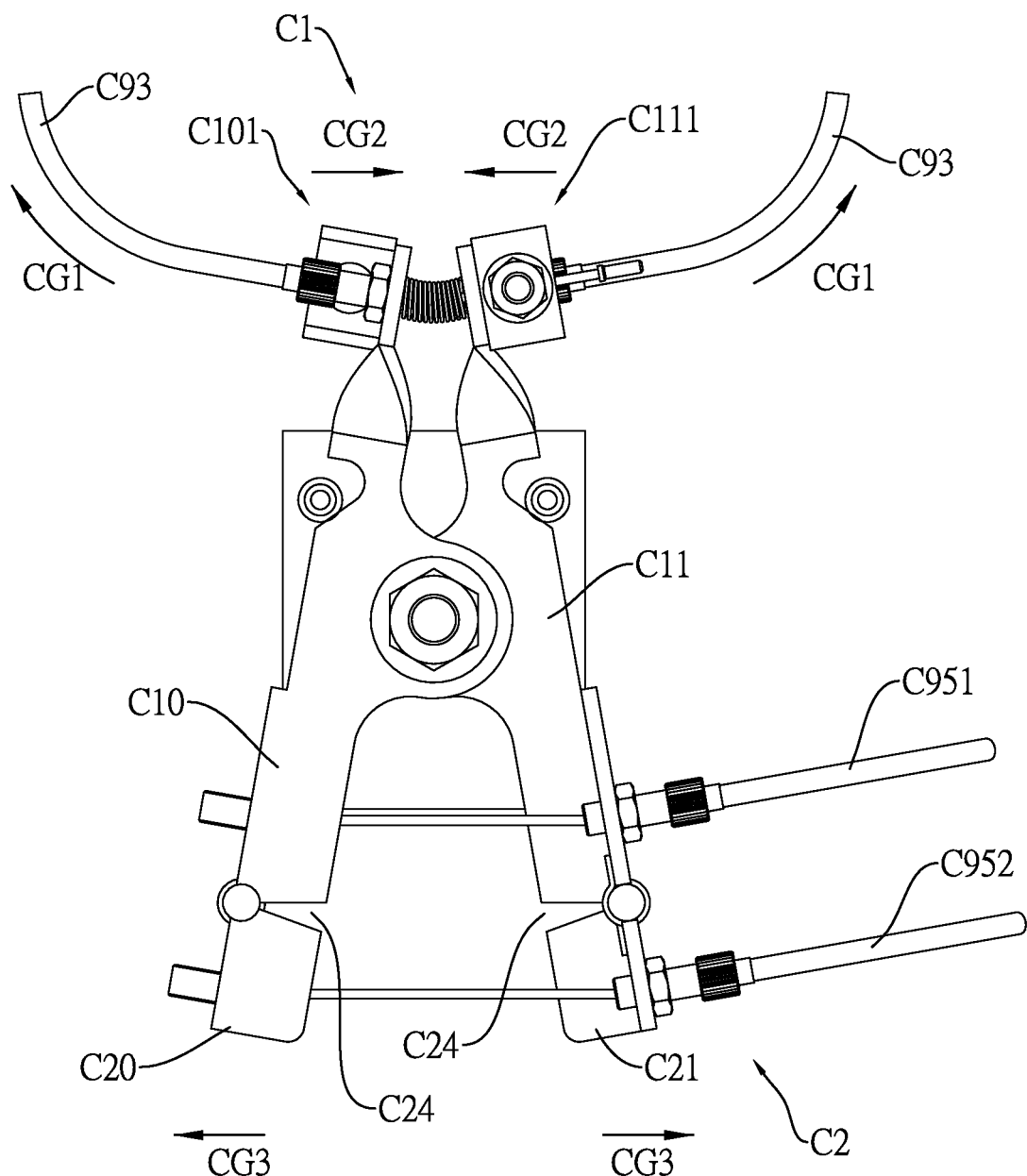
FIG. 29 shows the operational status of the safety braking system of the present invention in FIG. 27.
Figure 30:
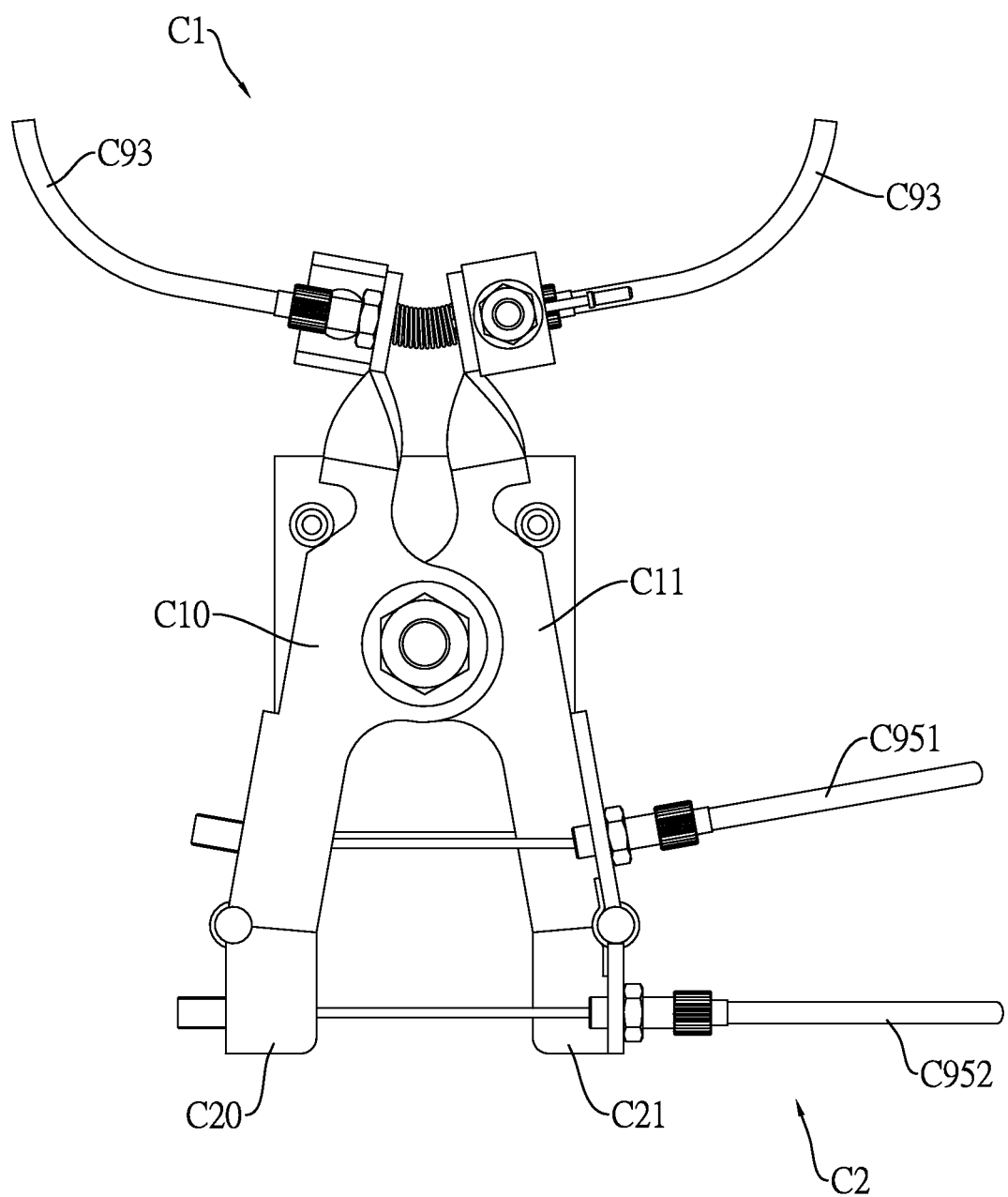
FIG. 30 shows the operational status of the safety braking system of the present invention in FIG. 29.

As shown in FIGS. 29 and 30, when the rider pulls the brake cables C93 which are applied by a force designated by the arrowhead CG1 in FIG. 29, the brake cable positioning portions C101, C111 of the two plates C10, C11 are moved toward each other as shown by the arrowhead CG2, in the meanwhile, the distance between the ends of the plates C10, C11 having the movable plates C20, C21 is increased as shown by the arrowhead CG3 in FIG. 29. As mentioned before, the amount that the lead cable C951 is pulled is less than that of the lead cable C952, so that the rear wheel brake C942 is first activated and the front wheel brake C941 is activated in sequence. In this moment, the rear wheel is braked by the rear wheel brake C942, however, the amount that the lead cable C951 is pulled cannot completely brake the front wheel. Accordingly, the gaps C24 of the movable unit C2 provide a buffering space as shown in FIG. 30. When the rider continues to pull the brake cables C93 and provide tension to the safety braking system C1, besides, the gaps C24, the plates C10, C11 and the movable plates C20, C21 are applied by the tension so that they are moved toward each other to fill the gaps C24. Therefore, the lead cable C951 is further operated to provide tension to the front wheel brake C941 to stop the front wheel. Eventually, the linear two-wheel vehicle C9 is completely stopped.

As shown in FIGS. 27 and 28, the resilient member C23 is an elongate resilient member which extends through the movable plates C21, C20 and the plates C10, C11, and mounted to the pivots C22 (FIG. 28 only shows the movable plate C21 and the plate C11). Two ends of the resilient member C23 respectively contact the movable plate C21 and the plate C11. When the brake cables C93 are pulled, the plates C10, C11, and the movable plates C20, C21 and fill the gaps C24 to provide the buffering feature to the resilient member C23.

Figure 31:
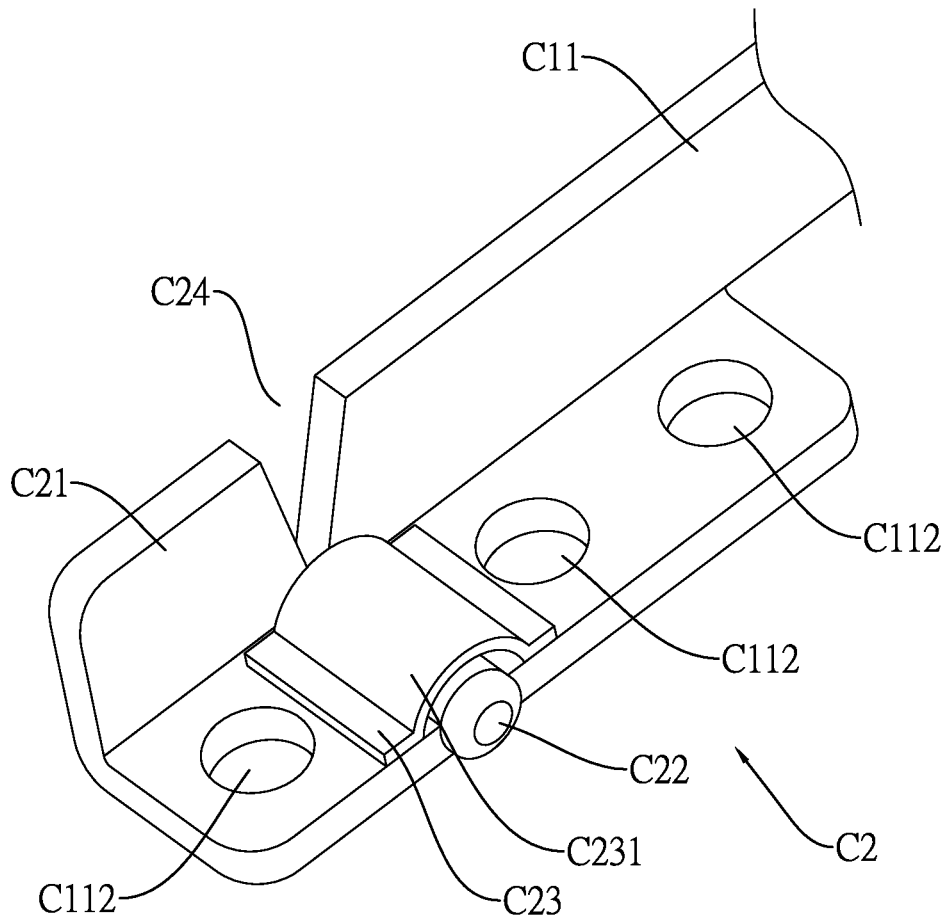
FIG. 31 shows another embodiment of the movable unit installed to the first embodiment of the safety braking system of the present invention.
Figure 32:
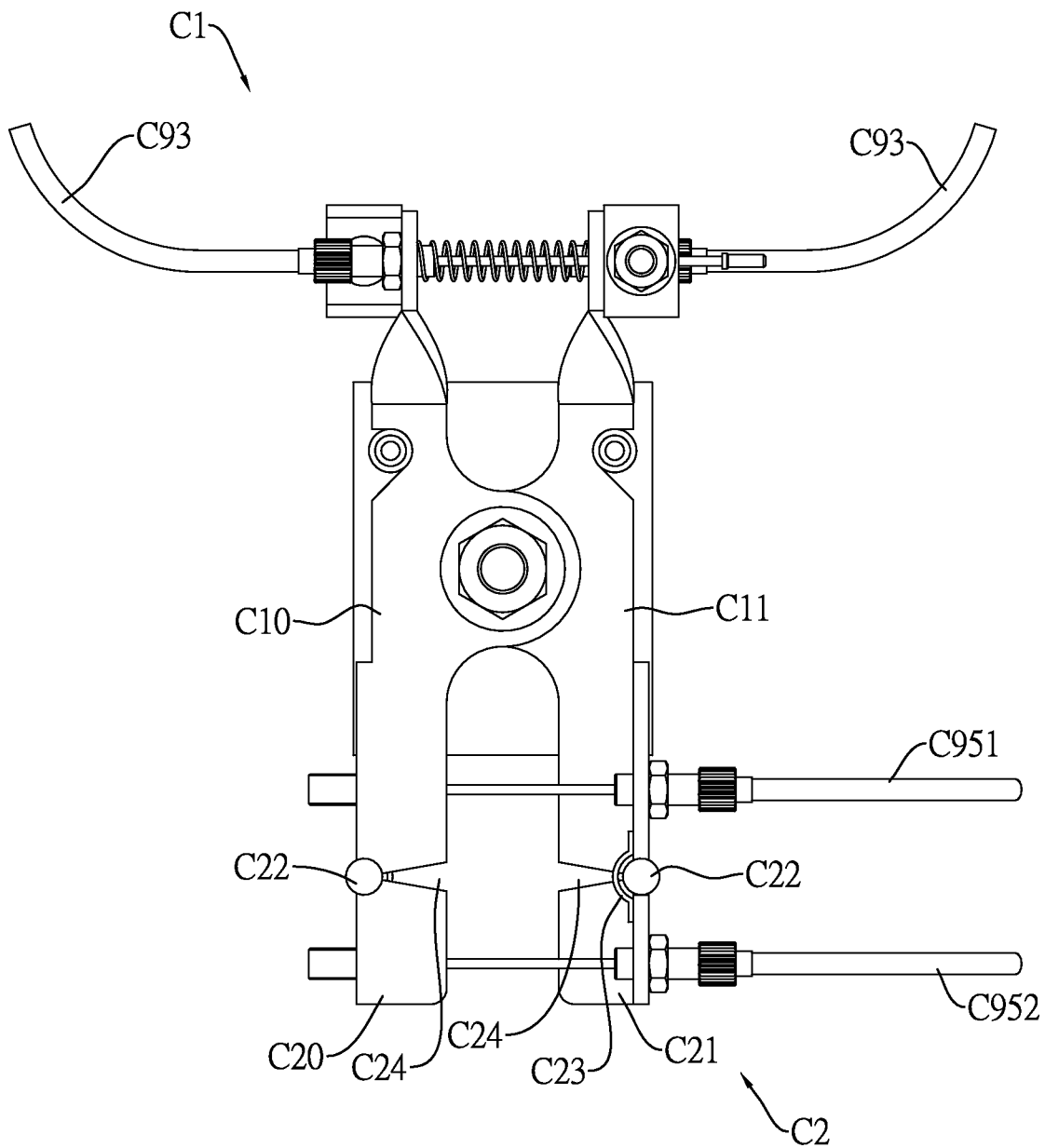
FIG. 32 shows the safety braking system of the present invention cooperated with the movable unit in FIG. 31.

As shown in FIGS. 31, 32, the resilient member C23 can be an elongate resilient member with two ends thereof fixed to the plate C11 and the movable plate C21 respectively. A curved portion C231 is formed at the mediate portion of the elongate resilient member so as to match with the pivot C22 (FIG. 31 only shows the plate C11 and the movable plate C21). When the brake cables C93 are pulled, the plates C10, C11, and the movable plates C20, C21 and fill the gaps C24.

Figure 33:
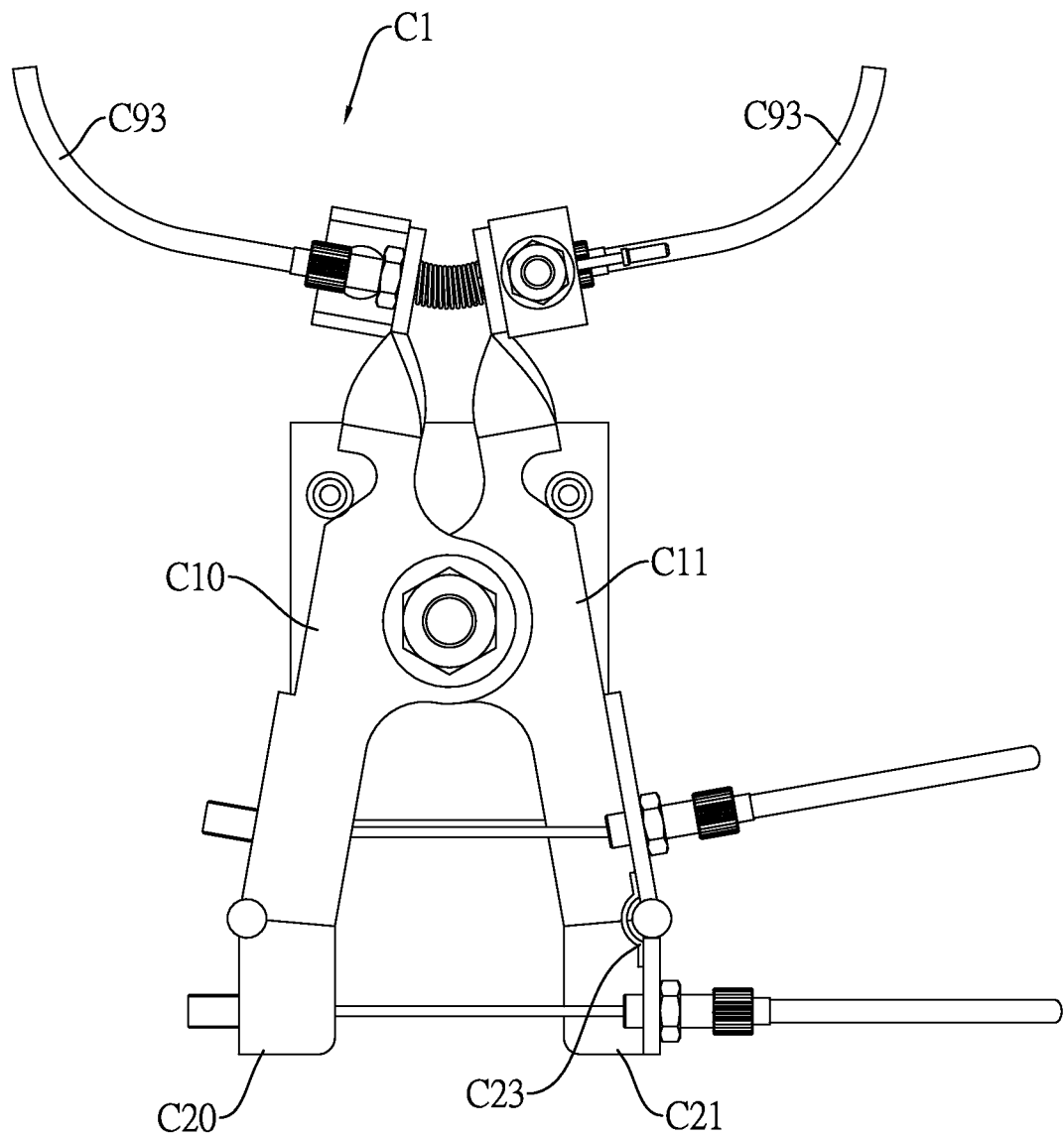
FIG. 33 shows the operational status in FIG. 32.

The resilient member C23 provides the buffering feature. FIGS. 32, 33 show the change of the resilient member C23 when the tension is applied to the resilient member.

Figure 34:
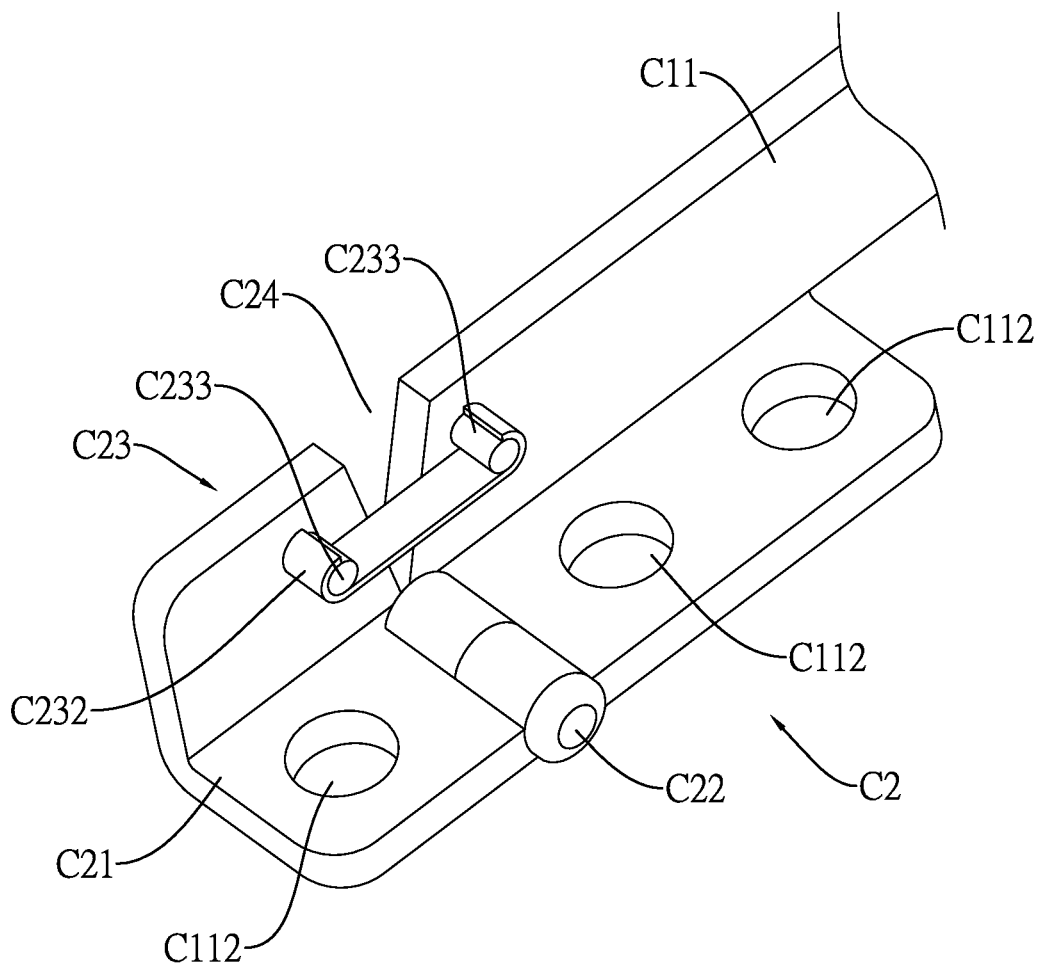
FIG. 34 shows yet another embodiment of the movable unit installed to the first embodiment of the safety braking system of the present invention.
Figure 35:
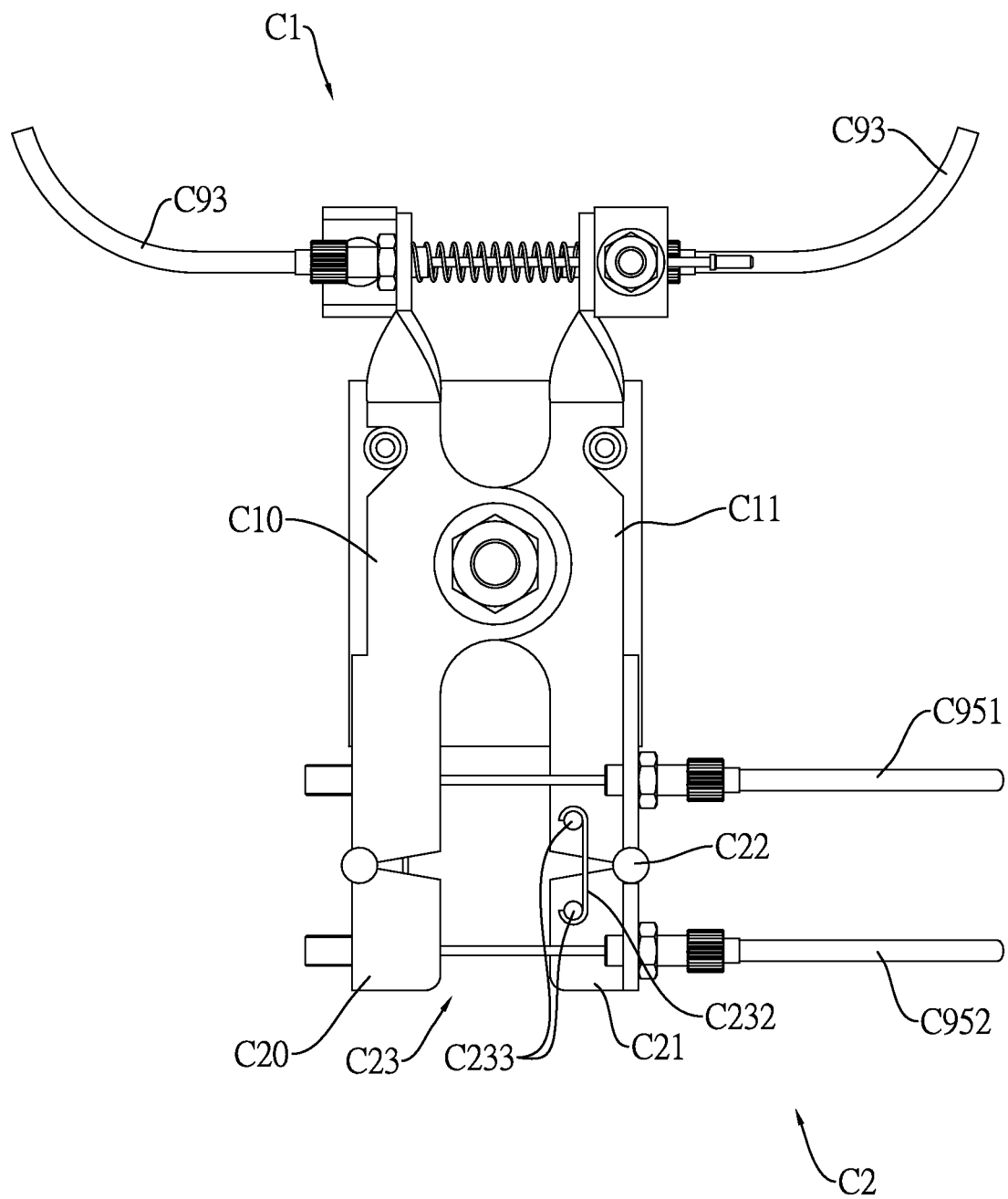
FIG. 35 shows the movable unit shown in FIG. 34.
Figure 36:
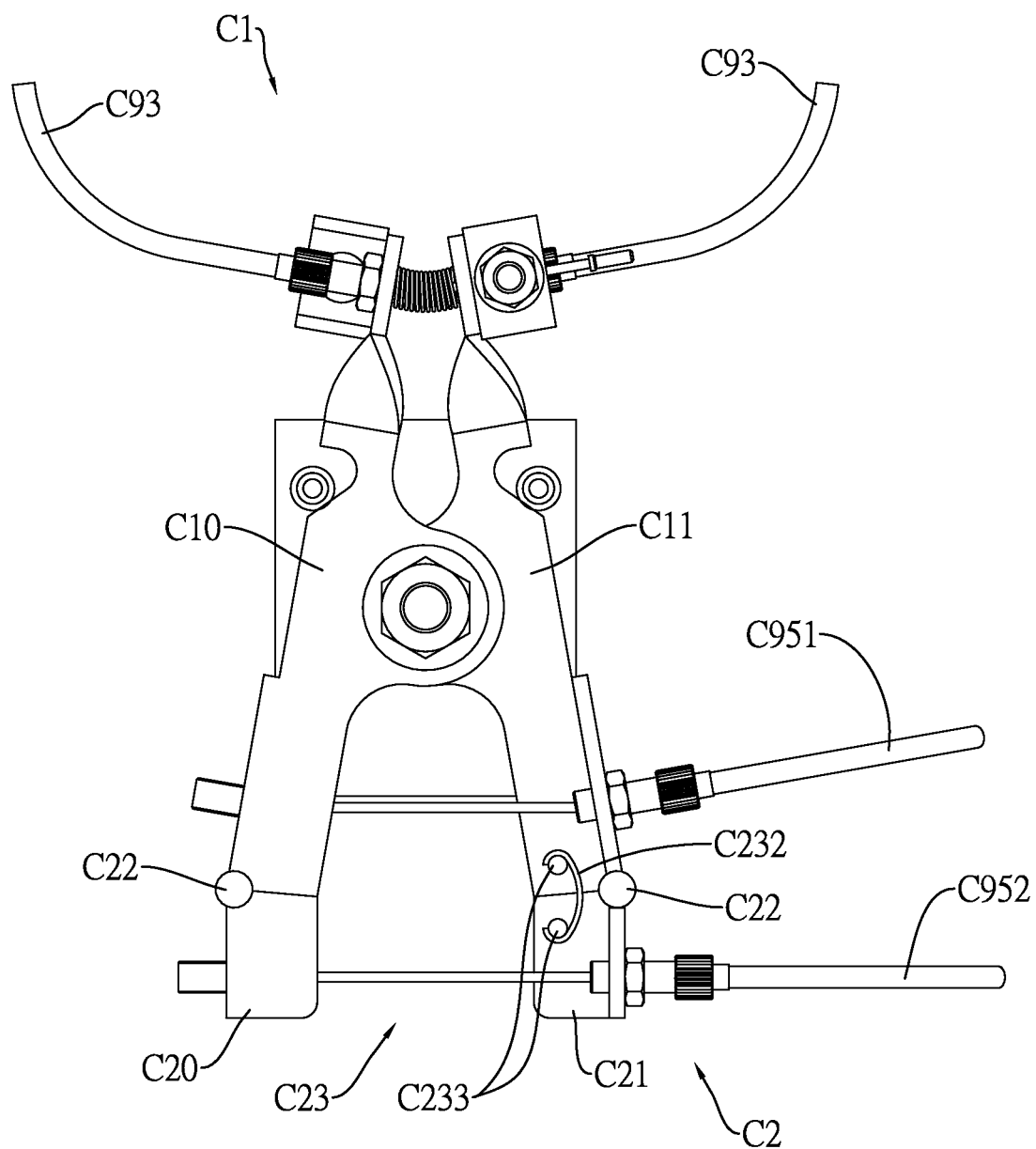
FIG. 36 shows the operational status of the movable unit in FIG. 35.

Furthermore, as shown in FIGS. 34, 35, the resilient member C23 can be an elongate resilient member C232 and two protrusions C233 which are respectively connected to the plates C10, C11 and the movable plates C20, C21. Two ends of the resilient member C23 respectively hook to the protrusions C233 and are fixed to the plates C10, C11 and the movable plates C20, C21 (FIG. 31 only shows the plate C11 and the movable plate C21). When the brake cables C93 are pulled, the plates C10, C11, and the movable plates C20, C21 and fill the gaps C24. The resilient member C23 provides the buffering feature. FIGS. 35, 36 show the change of the resilient member C23 when the tension is applied to the resilient member.

As shown in FIGS. 37 to 43, yet another embodiment of the safety braking system C1 comprises two plates C10, C11 which are the primary mechanism. One of the two plates C11 has a flat portion C113 extending therefrom. A through hole C110 is defined through the flat portion C113 and the plate C10 has another through hole C100. A transition portion C12 extends through the through hole C100, C110 to connect the two plates C10, C11 which are the primary mechanism. The plates C10, C11 respectively have a brake cable positioning portion C101, C111 at the end with the through holes C100, C110 and the brake cable positioning portion C101, C111 respectively has two brake cable holes C1011/C1111 (the drawing does not show C1011 which is located at the corresponding side of the brake cable holes C1111 as shown in FIG. 19) through which the brake cables C93 of the left and right brake levers C92 extend and are connected to the brake cable positioning portions C101, C111. One of the brake cables C93 extends through the brake cable hole C1011 and then the other brake cable hole C1111. The other brake cable C93 extends through the brake cable hole C1111 and then the brake cable hole C1011. Multiple lead cable holes C102, C112 are defined in the other end of the plates C10, C11 and located opposite to the through holes C100, C110 (the C102 is located corresponding to the lead cable hole C112 as shown in FIG. 19). The lead cable holes C102, C112 are located in radial direction relative to the through holes C100, C110, wherein the brake cable C951 of the front wheel brake 941 extends through the lead cable holes C102, C112 that are located close to the through holes C100, C110. The brake cable C952 of the rear wheel brake 942 extends through the lead cable holes C102, C112 that are located remote from the through holes C100, C110 so as to connect the two plates C10, C11 and to form the secondary power transmission mechanism.

Figure 37:
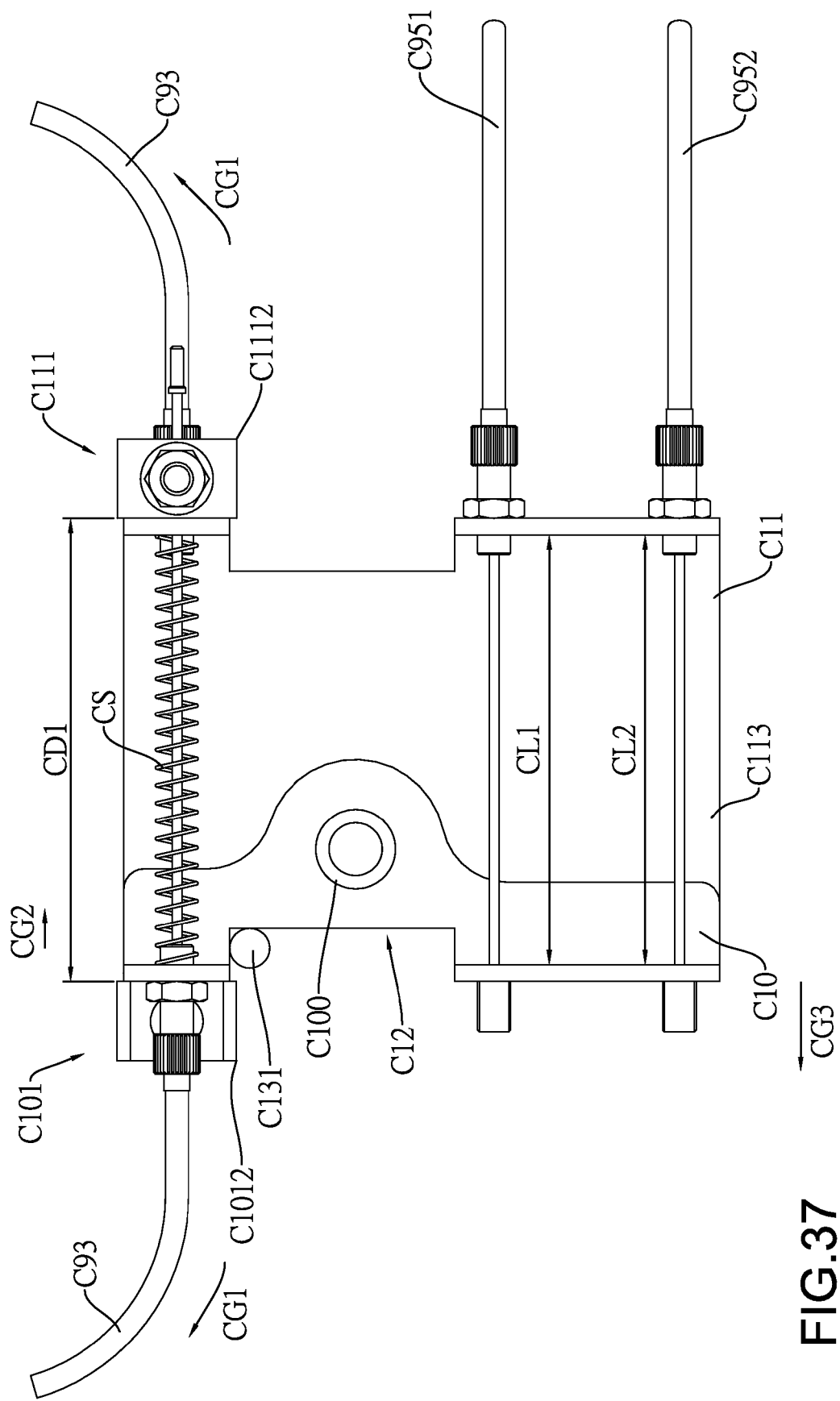
FIG. 37 shows yet another embodiment of the safety braking system of the present invention.
Figure 38:
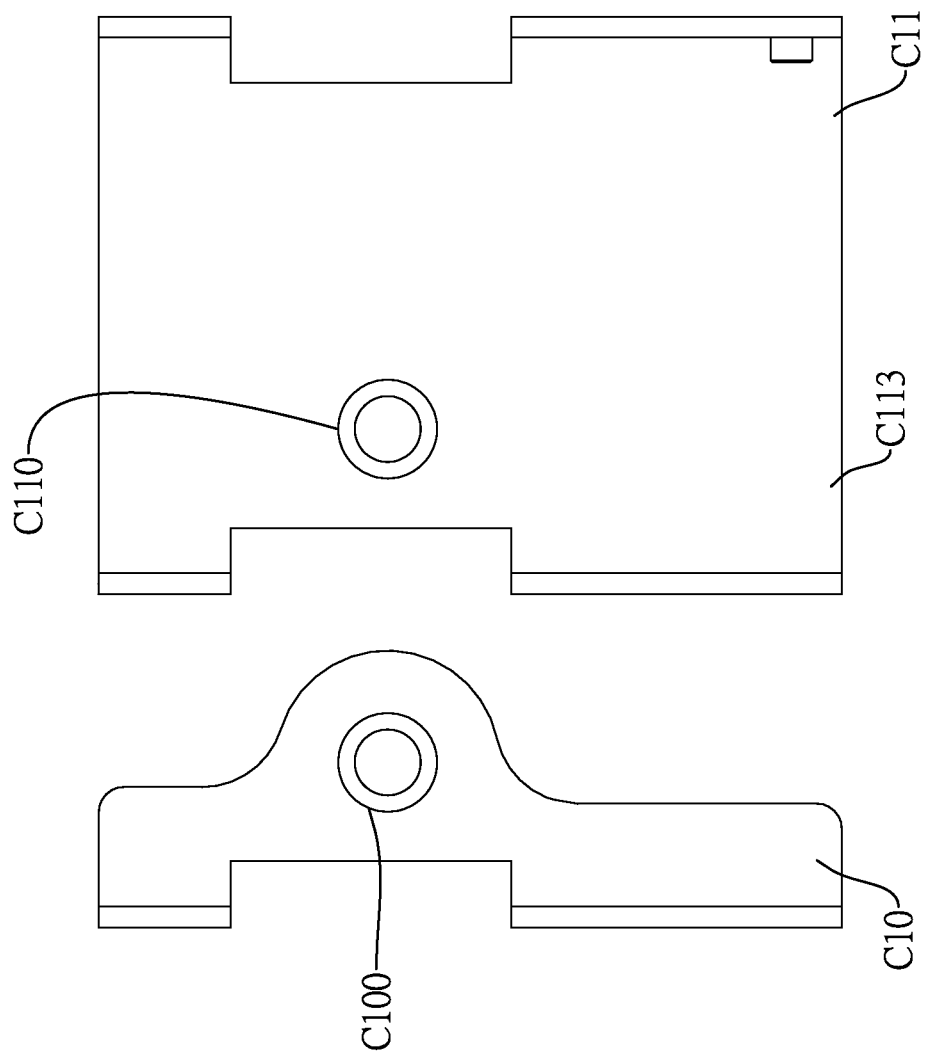
FIG. 38 is an exploded view of the safety braking system of the present invention.
Figure 39:
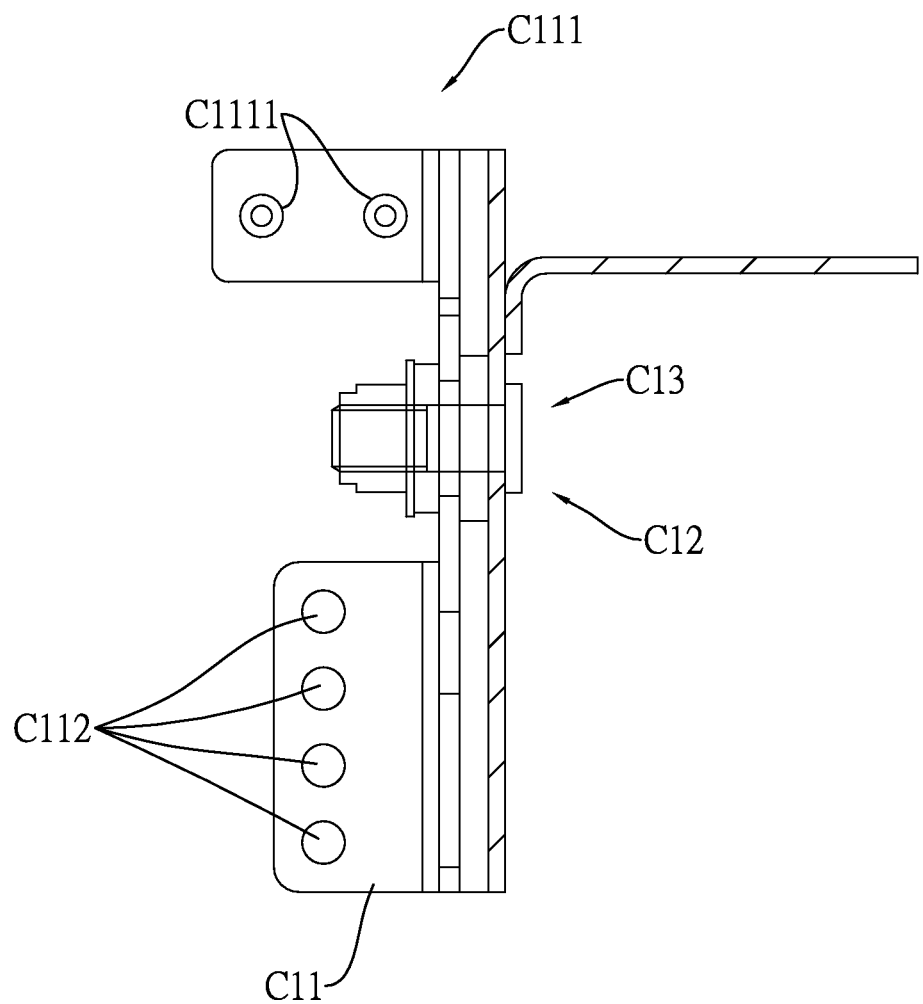
FIG. 39 is a side view of the embodiment in FIG. 37.
Figure 40:
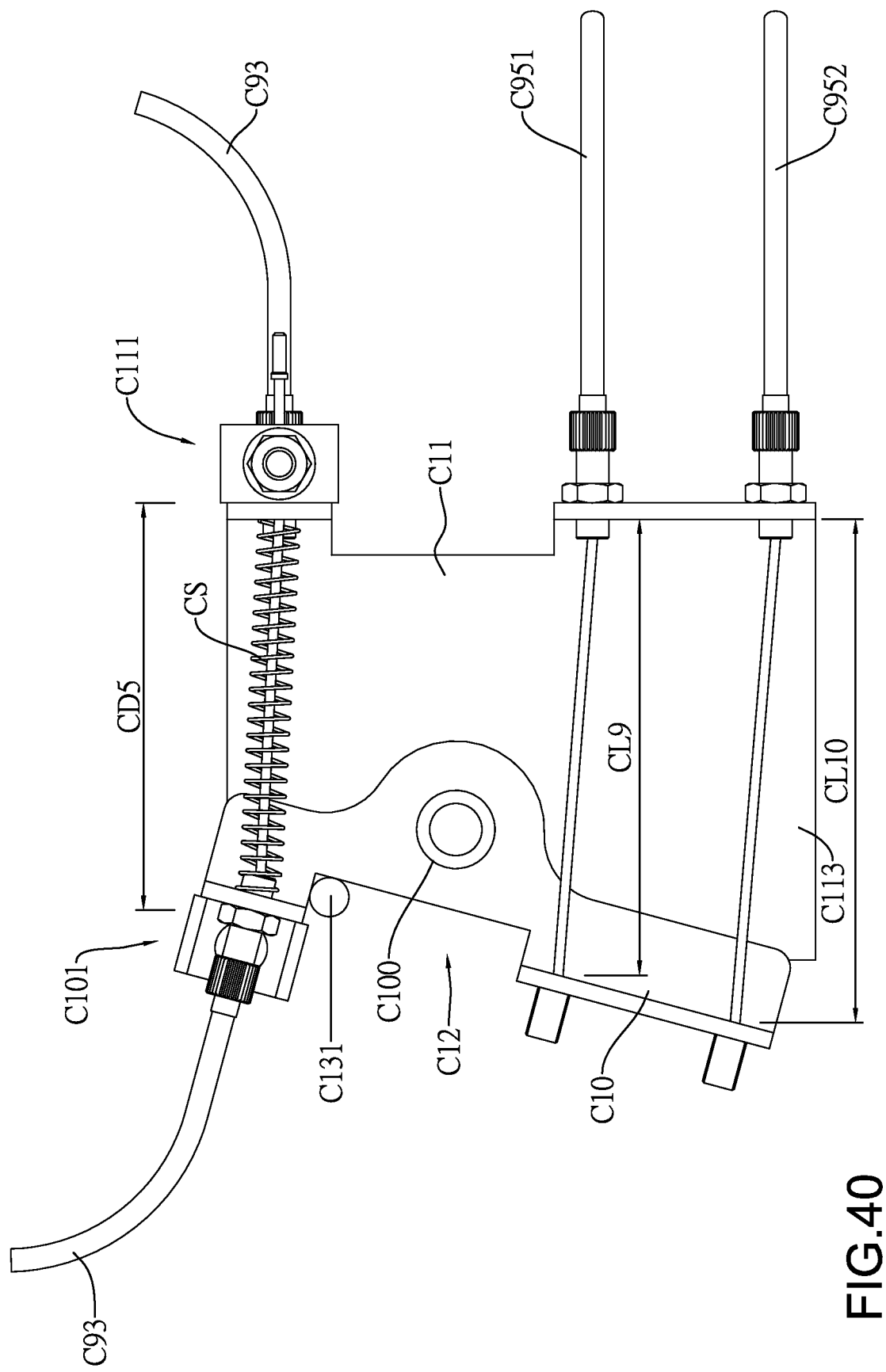
FIG. 40 is an operational status of the safety braking system of the present invention.

When the brake cable C93 is pulled in the direction designated by the arrowhead CG1 in FIG. 37, the brake cable positioning portion C101 of the plate C10 is moved toward the brake cable positioning portion C111 as shown in the direction designated by the arrowhead CG2 in FIG. 37. The distance of the two respective ends of the plates C10, C11 that have the lead cable holes C102, C112 is increased as shown in the direction designated by the arrowhead CG3 in FIG. 37. After the lead cable C93 is applied the force, the distance CD1 between the two the brake cable positioning portions C101, C111 is shortened to be CD5. The distances CL1, CL2 are pulled in different length because the distance from the through holes C100, C110 are different. The longer distance the distance CL1/CL2 from the through holes C100, C110, the longer that they are pulled. This is to say, the CL10 is larger than the CL9. The length that the lead cable C951 is pulled is shorter than that of the lead cable C952. The lead cable C951 is connected to the front wheel brake C941 and the lead cable C952 is connected to the rear wheel brake C942. Therefore, the rear wheel brake C942 will be first activated and then the front wheel brake C941 is activated in sequence.

FIGS. 37 to 42 show yet another embodiment of the safety braking system C1 which comprises a plate C11 with a flat portion C113 and another plate C10. The transition portion C12 extends through the through holes C100, C110 of the plate C10 and the flat portion C113. When the brake cables C93 are pulled tight, the distance between the brake cable positioning portions C101, C111 are shortened, the brake cable positioning portion C101 on the plate C10 moves close to the brake cable positioning portion C111 of the plate C11.

A spring CS may be connected between the brake cable positioning portion C101, C111, and the spring CS is mounted to the brake cable C93 so as to buffer the compression between the brake cable positioning portions C101, C111.

As shown in FIG. 19, the transition portion C12 has a connection rod C120, a sleeve C122, a washer C121, and a nut C123. The sleeve C122 extends through the washer C121 and the connection rod C120 extends through the sleeve C122 and the washer C121, and the nut C123 is fixed to the connection rod C120 to connect the two plates C10, C11.

Furthermore, the plate C11 having the flat portion C113 has a fixing member C13 at the rear side thereof and the fixing member C13 has a positioning rod C131 which stops the plate C10 without the flat portion C113.

The fixing member C13 has a connection hole C130 and the safety braking system C1 is connected to the linear two-wheel vehicle C9 by the connection hole C130.

As described before, if the rider wants to adjust the time delay between the front and rear wheel brakes C941, C942, the rider simply change the positions that the lead cables C951 relative to the lead cable holes C102, C112.

Figure 41:
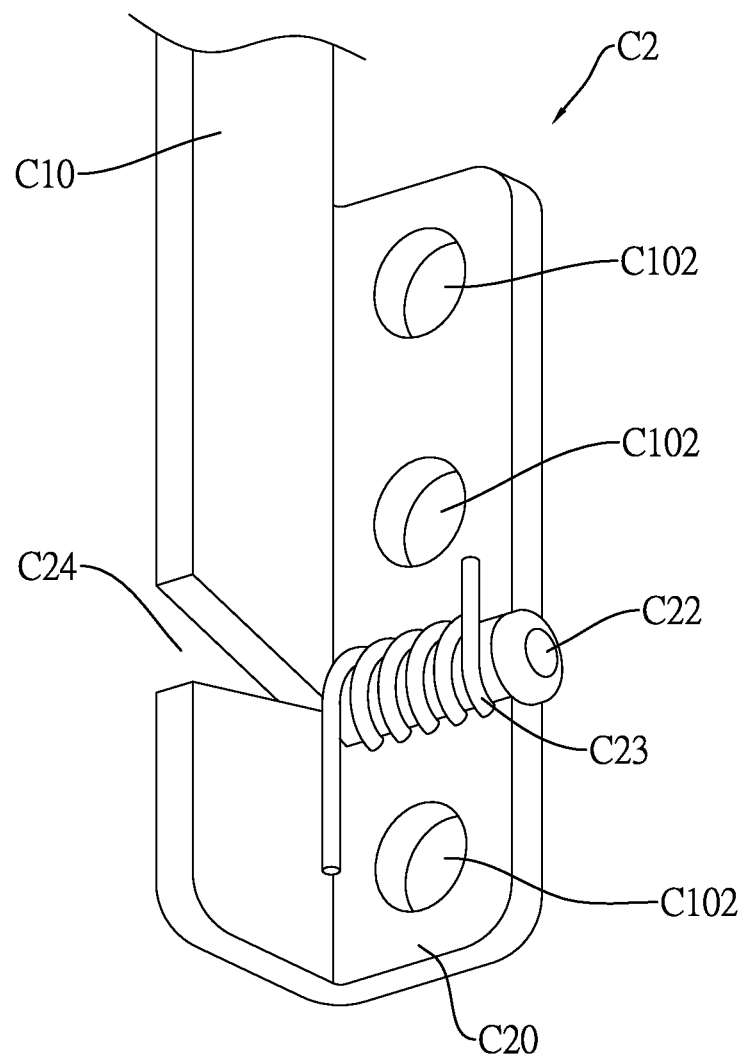
FIG. 41 is an enlarged view to show the movable unit of another embodiment of the safety braking system of the present invention.
Figure 42:
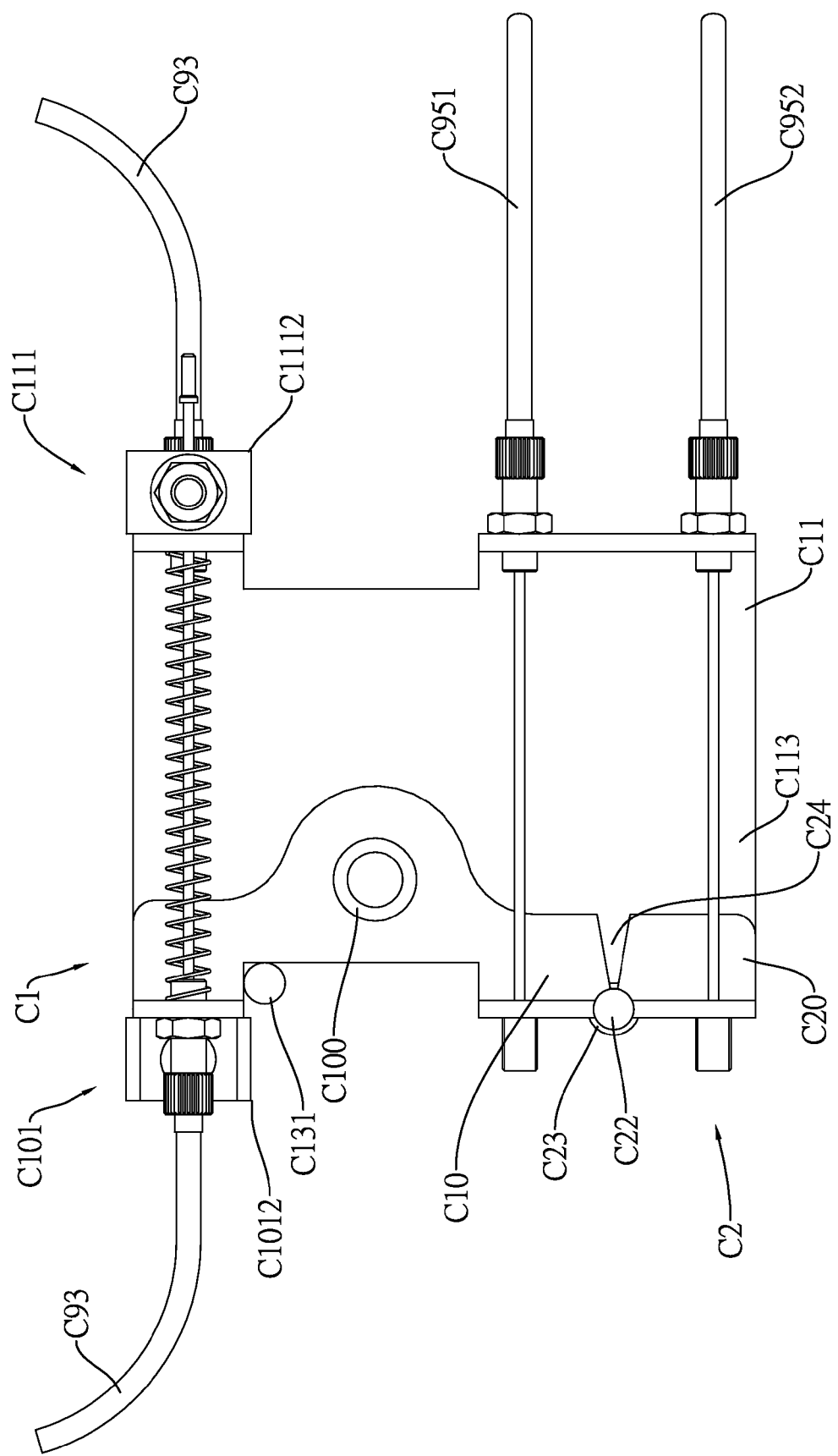
FIG. 42 shows the movable unit disclosed in FIG. 41.

FIGS. 41 and 42 show yet another embodiment of the safety braking system. C1 which has a movable unit C2. The movable unit C2 comprises a movable plate C20 which is pivotably connected to the end having the lead cable hole C102 of the plates C10 without the flat portion C113 by a pivot C22.

A resilient member C23 is connected to pivotal portion between the plate C10 without the flat portion C113 and the movable plate C20 so as to connect the plate C10 without the flat portion C113 and the movable plate C20.

One or more than one lead cable hole C102 is defined through the movable plate C20.

A gap C24 is defined in the pivotal portion between the plate C10 and the movable plate C20. The gap C24 expands from the pivotal portion.

The lead cable C951 of the front wheel brake C941 extends through the lead cable holes C102, C112 of the plates C10, C11, and the lead cable C952 of the rear wheel brake C942 extends through the lead cable hole C102 of the movable plate C20 and the lead cable hole C112 of the flat portion C113 of the plate C11 that is located remote from the through hole C100.

Figure 43:
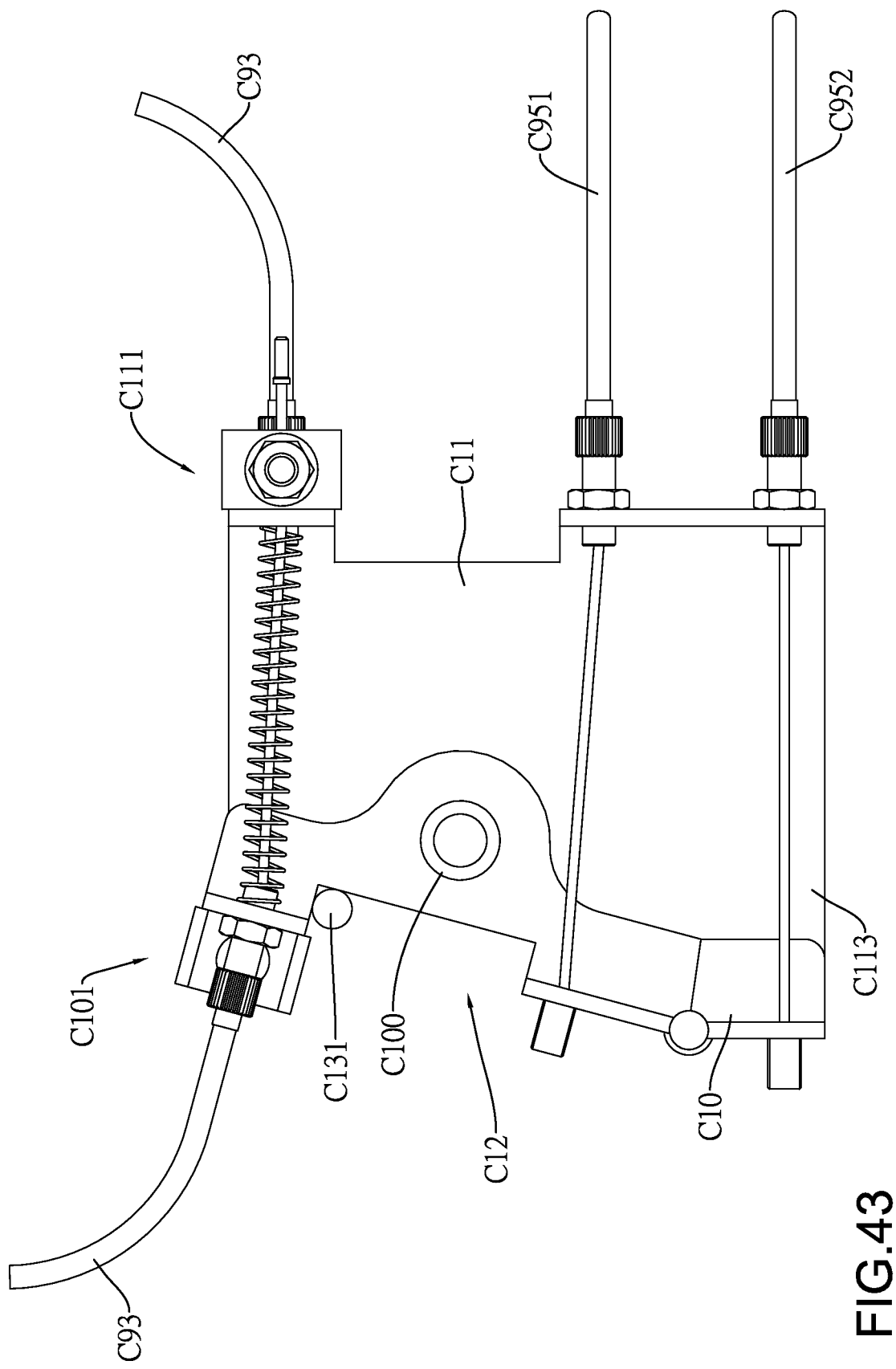
FIG. 43 is the operational status of the movable unit disclosed in FIG. 42.

FIGS. 42 and 43 show that the movable unit C2 has the same function when it is connected to the plate C10 only. As shown in FIG. 28, as mentioned before, the resilient member C23 is an elongate resilient member and extends through the movable plate C21 and the plate C10, and the resilient member C23 is located around the pivot C22 (FIG. 27 only shows the movable plate C21 and the plate C11). The two ends of the resilient member C23 are respectively in contact with the movable plate C20 and the plate C10.

As shown in FIG. 31, the resilient member C23 is an elongate resilient member C232 and two ends of the resilient member C23 are respectively fixed to the plate C10 and the movable plate C20. A curved portion C231 is formed at a mediate portion of the resilient member C23 so as to match with the pivot C22 (FIG. 31 only shows the movable plate C21 and the plate C11).

As shown in FIG. 34, the resilient member C23 includes an elongate resilient member C232 and two protrusions C233 which are respectively connected to the plate C10 and the movable plate C20. Two ends of the resilient member C23 respectively hook to the protrusions C233 and are fixed to the plates C10 and the movable plate C20 (FIG. 34 only shows the movable plate C21 and the plate C11).

The resilient members disclosed above are cooperated with the plate C11 and the movable plate C21, it is noted that resilient members can also be cooperated with the plate C10 and the movable plate C20.

The embodiment in FIG. 26 is an extension from the embodiment of FIG. 21, it is noted that the applications are not restricted by the embodiments disclosed in the drawings.

In the embodiments of the safety braking systems C1 mentioned above, the brake cable positioning portions C101, C111 each have a locking member C1012, C1112 as shown in FIG. 19. The locking member C1012, C1112 secure the brake cables C93 extending through the brake cable holes C1011, C1111 to the brake cable positioning portions C101, C111

As mentioned before, the fixing member C13 may be in the form without the connection hole C130, and the fixing member C13 is connected to the linear two-wheel vehicle C9 by way of gluing or threading.

While we have shown and described the embodiment in accordance with the present invention, it should be clear to those skilled in the art that further embodiments may be made without departing from the scope of the present invention.

What is claimed is:

1. A safety braking system mounted to a linear two-wheel vehicle and having a right brake lever and a left brake lever to respectively control applying a brake to a front wheel and a rear wheel of the vehicle, comprising:
    a safety brake connected between the right and left brake levers and the front and rear wheel brakes, whenever either the right brake lever or the left brake lever is pulled, the safety braking system controls the rear wheel brake to be activated before the front wheel brake to be activated,
    at least one primary mechanism and a secondary power transmission mechanism, the left and right brake levers connected to the primary mechanism which transfers a braking force generated from either the left or right brake levers to the secondary power transmission mechanism, the secondary power transmission mechanism transfers the braking forces to the front and the rear wheel brakes, to control the rear wheel brake to be activated first and then the front wheel brake to be activated in sequence, wherein the safety braking system comprises two plates which are the primary mechanism, the two plates each have a through hole, a transition portion extends through the through holes so as to connect the two plates, the plates each have a brake cable hole and a brake cable positioning portion which is located at an end where the through holes are defined, brake cables of the left and right brake levers extend through the two brake cable holes to connect the two plates, multiple lead cable holes are defined in an other end of the plates and located opposite to the through holes, the lead cable holes are located in radial direction relative to the through holes, a lead cable of the front wheel brake extends through the lead cable holes that are located close to the through holes, a lead cable of the rear wheel brake extends through the lead cable holes that are located remote from the through holes so as to connect the two plates and to form the secondary power transmission mechanism.

2. The system as claimed in claim 1, wherein two springs are respectively connected between the two brake cable positioning portions and located around the two brake cables, the transition portion has a connection rod, a sleeve, a washer, and a nut, the sleeve extends through the washer and the connection rod extends through the sleeve and the washer, and the nut is fixed to the connection rod to connect the two plates.

3. The system as claimed in claim 2, wherein the connection rod has a fixing member at a distal end thereof and the fixing member has a connection hole adapted to be connected to the linear two-wheel vehicle, the fixing member has a positioning rod to control positions of the two plates.

4. The system as claimed in claim 1, wherein each of the two plates has a movable unit, each movable unit comprises a movable plate which is pivotably connected to an end having a lead cable hole for the plate by a respective pivot, two resilient members are respectively connected to pivotal portions between the two plates and the two movable plates, one or more than one lead cable hole is defined through each movable plate, two gaps are defined in the pivotal portions between the two plates and the two movable plates, the two gaps expand from the pivotal portions, the lead cable of the front wheel brake extends through the lead cable holes of the plates, the lead cable of the rear wheel brake extends through the lead cable holes of the movable plates.

5. The system as claimed in claim 4, wherein the resilient member is an elongate resilient member and extends through the movable plate and the plate, the resilient member is located around the pivot.

6. The system as claimed in claim 4, wherein the resilient member is an elongate resilient member and two ends of the elongate resilient member are respectively fixed to the plate and the movable plate, a curved portion is formed at a mediate portion of the elongate resilient member so as to match with the pivot.

7. The system as claimed in claim 4, wherein the resilient member includes an elongate resilient member and two protrusions which are respectively connected to the plates and the movable plates, two ends of the elongate resilient member respectively hook to the protrusions and are fixed to the plates and the movable plates.

8. The system as claimed in claim 1, wherein one of the two plates has a flat portion extending therefrom, the through hole of the plate having the flat portion is defined through the flat portion, a transition portion extends through the through hole to connect the two plates, the plates have a brake cable positioning portion at an end with the through hole and two brake cable holes through which the brake cables of the left and right brake levers extend and connect the two plates.

9. The system as claimed in claim 8, wherein two springs are connected between the two brake cable positioning portions and located around the two brake cables, the transition portion has a connection rod, a sleeve, a washer, and a nut, the sleeve extends through the washer and the connection rod extends through the sleeve and the washer, and the nut is fixed to the connection rod to connect the two plates.

10. The system as claimed in claim 8, wherein the plate having the flat portion has a fixing member at a rear side thereof and the fixing member has a positioning rod which stops the plate without the flat portion.

11. The system as claimed in claim 8, wherein at least one plate has a movable unit, the movable unit comprises a movable plate which is pivotably connected to the end having the lead cable hole of the plates without the flat portion by a pivot, a resilient member is connected to pivotal portion between the plate without the flat portion and the movable plate, one or more than one lead cable hole is defined through the movable plate, a gap is defined in the pivotal portion between the plate and the movable plate, the gap expands from the pivotal portion, the lead cable of the front wheel brake extends through the lead cable holes of the plates, the lead cable of the rear wheel brake extends through the lead cable hole of the movable plate and the lead cable hole of the flat portion of the plate that is located remote from the through hole.

12. The system as claimed in claim 11, wherein the resilient member is an elongate resilient member and extends through the movable plate and the plate without the flat portion, the elongate resilient member is located around the pivot.

13. The system as claimed in claim 11, wherein the resilient member is an elongate resilient member and two ends of the elongate resilient member are respectively fixed to the plate without the flat portion, a curved portion is foamed at a mediate portion of the elongate resilient member so as to match with the pivot.

14. The system as claimed in claim 11, wherein the resilient member includes an elongate resilient member and two protrusions which are respectively connected to the plate without the flat portion and the movable plate, two ends of the elongate resilient member respectively hook to the protrusions and are fixed to the plates and the movable plate.

\* \* \* \* \*